(12) United States Patent
Doan et al.

(10) Patent No.: US 11,966,663 B1
(45) Date of Patent: Apr. 23, 2024

(54) SPEECH PROCESSING AND MULTI-MODAL WIDGETS

(71) Applicant: Amazon Technologies, Inc., Seattle, WA (US)

(72) Inventors: Nhat Vu Doan, Seattle, WA (US); Nicholas Adam Cummings, Lynnwood, WA (US); Prashant Jayaram Thakare, Sammamish, WA (US); Jalaj Kumar, Seattle, WA (US); Ganesh Prabu Ravi, Seattle, WA (US); Chih-Shin Wang, Bellevue, WA (US); Narenda Gyanchandani, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 373 days.

(21) Appl. No.: 17/488,385

(22) Filed: Sep. 29, 2021

(51) Int. Cl.
*G10L 15/00* (2013.01)
*G06F 3/16* (2006.01)
*G10L 15/197* (2013.01)
*G10L 15/22* (2006.01)

(52) U.S. Cl.
CPC ............ *G06F 3/167* (2013.01); *G10L 15/197* (2013.01); *G10L 15/22* (2013.01)

(58) Field of Classification Search
None
See application file for complete search history.

(56) References Cited

U.S. PATENT DOCUMENTS

| | | | |
|---|---|---|---|
| 11,094,316 B2* | 8/2021 | Visser | G06F 40/216 |
| 11,579,841 B1* | 2/2023 | Eich | G06F 9/4881 |
| 2013/0144629 A1* | 6/2013 | Johnston | G10L 15/22 |
| | | | 704/E11.001 |
| 2021/0012770 A1* | 1/2021 | Choudhary | G10L 15/22 |
| 2022/0207426 A1* | 6/2022 | Scherer | G06F 18/2113 |
| 2022/0292134 A1* | 9/2022 | Shahbazi Mirzahasanloo | |
| | | | G06F 21/32 |

* cited by examiner

*Primary Examiner* — Satwant K Singh
(74) *Attorney, Agent, or Firm* — Pierce Atwood LLP

(57) ABSTRACT

Techniques for performing speech processing using multi-modal widget information are described. A system may receive input data corresponding to a user input. The system may also receive widget context data corresponding to one or more multi-modal widgets active at a device. The system may use the widget context data to perform natural language understanding (NLU) processing with respect to the user input, and for selecting a skill component for responding to the user input. The system may send a widget identifier to the skill component when invoking the skill to respond to the user input.

20 Claims, 8 Drawing Sheets

SPEECH PROCESSING AND MULTI-MODAL WIDGETS

BACKGROUND

Natural language processing systems have progressed to the point where humans can interact with and control computing devices using their voices. Such systems employ techniques to identify the words spoken by a user based on the various qualities of received input data. Speech recognition combined with natural language understanding processing techniques enable speech-based user control of computing devices to perform tasks based on the spoken inputs. Speech recognition and natural language understanding processing techniques are sometimes referred to collectively or separately as spoken language understanding (SLU) processing. SLU processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

DETAILED DESCRIPTION

Figure 1:
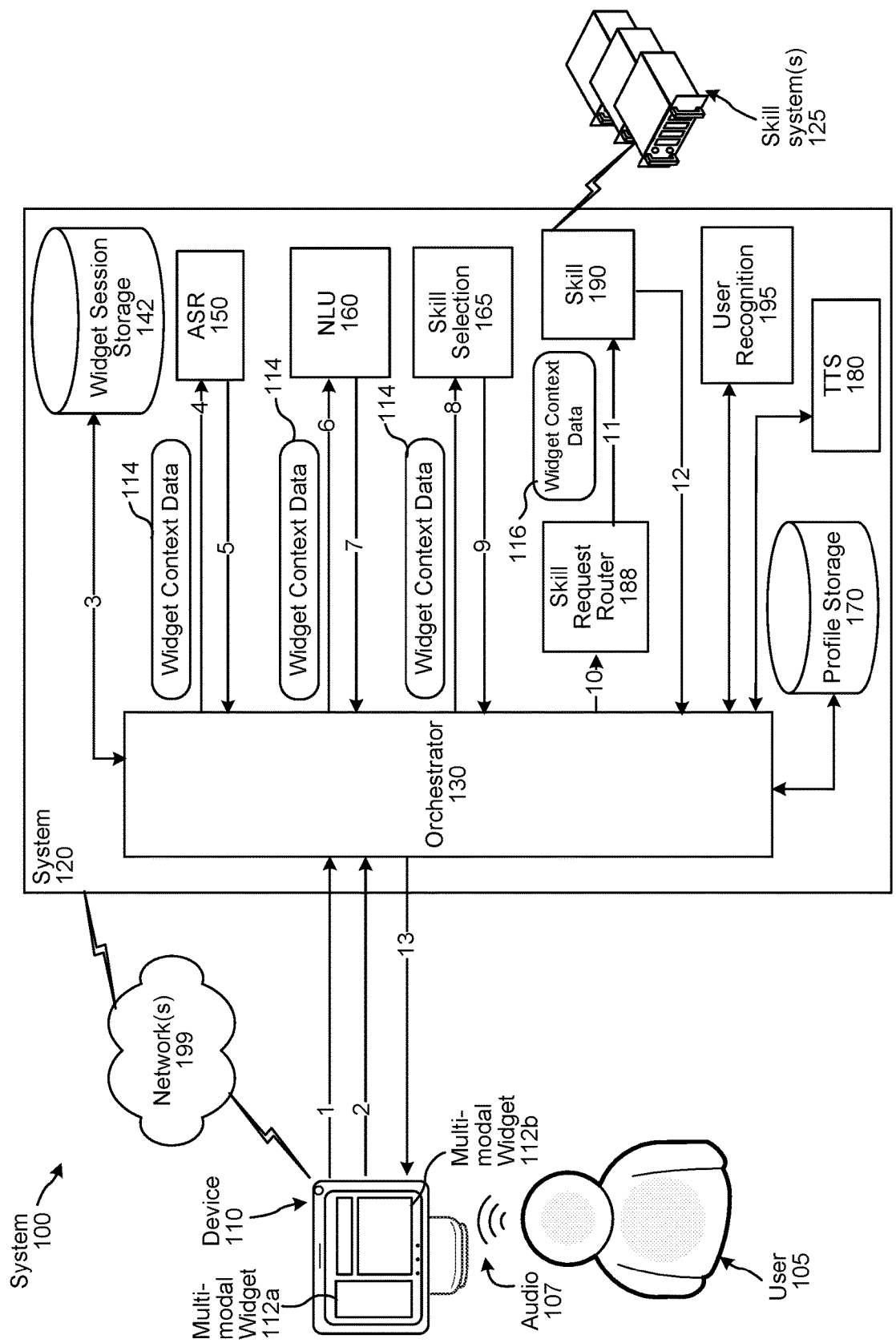
FIG. 1 is a conceptual diagram illustrating a system for performing speech processing in view of multi-modal widgets presented at a device, according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system. Text-to-speech (TTS) is a field of concerning transforming textual data into audio data that is synthesized to resemble human speech.

Certain devices that have a display screen may present content to a user. Some such devices may be configured to present content from multiple applications via, what is referred to as, multi-modal widgets herein. A multi-modal widget may correspond to a portion of a display screen that presents visual content, that may automatically updates when appropriate, and that the user may interact with using touch inputs and/or voice inputs.

Multi-modal widgets, as used herein, may be glanceable, self-updating, and interactive view of content and functionality displayed on a device screen. Multi-modal widgets may offer ambient experiences (where various technology, systems, devices—and data gathered by them seamlessly interact and adapt to a user's needs), enable better multitasking on the system, and increase the discoverability of skills. For example, a developer can use the multi-modal widgets to surface latest content or upcoming events, interact with users without starting a full skill experience, and give users a quick way to go directly to the desired or most interesting part of a skill. In addition to viewing content, a user may also perform actions using a multi-modal widget. For example, a user can check an item off a list or add an item to a list using touch or voice inputs. Depending on the user action, the multi-modal widget may update inline (i.e. update the present content at the multi-modal widget) or start a full-screen experience (i e. open a new user interface screen).

A developer may create a multi-modal widget by defining a rendered document (via software code) and how information is to be presented visually via the rendered document, how instructions are to be executed with respect to the rendered document, etc. The developer may also define data sources from which the multi-modal widget can be populated. For example, a weather multi-modal widget may receive weather data from a weather service. A single multi-modal widget may receive data from multiple sources. The multi-modal widget may update the data by requesting updated data from the data source or based on the data source pushing updated data to the multi-modal widget. The rendered document definition may include instructions on how the data is to be updated.

A system may control a multi-modal widget at a device using a particular type of software language. In some embodiments, the system may control multi-modal widgets using a JSON-based HTML5 language. An example of such a software language is the Alexa Presentation Language (APL). Other types of software languages may be used to control multi-modal widgets. Using APL, a developer may create visual experiences to accompany a skill, such as, animations, graphics, images, slideshows, video, etc., which may be presented to a user via a multi-modal widget. A developer may create JSON files including software instructions to control the multi-modal widget. Such JSON files may be referred to herein as an APL document. The APL document may be invoked and downloaded to a user device. The user device may import images and other data indicated in the APL document and render the programmed experience at the user device.

The system may provide multi-modal widget templates that can be customized by a developer using the APL document. The multi-modal widget templates may correspond to different widget sizes that can be used to control the size of the multi-modal widget on the device screen. The multi-modal widgets templates may include a list template that can be used to display a list of items (e.g., a shopping list, a task list, etc.), which may include text and/or images. The multi-modal widgets templates may include a text wrapping template that can be used for text-based experiences (e.g., displaying tips, facts, instructions, etc.). Another multi-modal template may be an action button template that can be used to present content along with a button that a user can select to perform an indicated action. Another multi-modal template may be an image-caption template that can be used to present an image along with text. Yet another multi-modal template may be a photo template that can be used to present an image as focused-content.

Some devices may enable a user to interact with skills. As used herein, a "skill" may refer to software, that may be installed on a machine or a virtual machine (e.g., software that may be launched in a virtual instance when called or otherwise activated), configured to process natural language understanding (NLU) output data (e.g., including an intent and optionally one or more entities) and perform one or more actions in response thereto. What is referred to herein as a skill may sometimes be referred to as or otherwise incorporated into an application, bot, action, or the like. A group of skills of related functionality may be associated with a domain. For example, a first music skill and a second music skill may be associated with a music domain. A user may interact with skills using voice inputs and/or touch inputs. Skills may provide multi-modal widgets to enable the user to interact with the skill using touch inputs.

The present disclosure relates to performing speech processing in view of multi-modal widgets presented by a screen of a device. Techniques of the present disclosure enable a user to multitask and seamlessly switch between interactions with multiple multi-modal widgets. Techniques of the present disclosure also enables a user to switch between interacting with a skill corresponding to a multi-modal widget and another skill that may not have a corresponding multi-modal widget presented at the device.

A device or a system, of the present disclosure, can use contextual information of the multi-modal widgets being presented at the device to interpret natural language inputs provided by the user. The widget context data may indicate the content presently being displayed at the multi-modal widget. The widget context data may also include a name of the multi-modal widget, a skill associated with the multi-modal widget, a widget identifier and a widget instance identifier. The device/system may use the widget context data to determine an intent of a natural language input and entity data corresponding to the natural language input. For example, the device/system may determine, using the widget context data, that the intent of the natural language input corresponds to the multi-modal widget or that the entity data corresponds to the content being presently displayed at the multi-modal widget. The device/system may further use the widget context data to select a skill for processing with respect to the natural language input.

Multiple instances, presenting different content, of the same multi-modal widget may be presented at a device. For example, a device may display weather information for a first city via a first instance of a weather multi-modal widget, and the device may also display weather information for a second city via a second instance of the weather multi-modal widget. In some embodiments, the device/system determines which multi-modal widget instance, at the device, the natural language input corresponds to, and send an indication of the multi-modal widget instance to the skill. The skill may use the multi-modal widget instance to determine an output responsive to the natural language input. The skill may alternatively or additionally send a command to the device to present an output responsive to the natural language input via the multi-modal widget instance. For example, the device may present a first shopping list via a first instance of a list multi-modal widget and a second shopping list via a second instance of the list multi-modal widget. The device/system may determine that a user's voice input to: "remove [item] from my list" corresponds to the first shopping list, and may send an identifier for the first instance of the list multi-modal widget to a list skill, so that the list skill may perform an action, responsive to the user input, with respect to the first list. As part of the action, the list skill may cause the device to update the first instance of the list multi-modal widget (corresponding to the first shopping list) based on the received identifier for the first instance of the list multi-modal widget.

Using the widget context data, skills may determine how an output is to be presented to the user. For example, a skill may select from presenting an output within the widget's existing layout/display configuration (referred to herein as "inline") or launching a full screen interface to present the output (i.e. opening a new screen/window to present the output). The skill may determine how to present the output based on the widget context data indicating the content being presently displayed at the device at the multi-modal widget. For example, if the output relates to the presently displayed content, then the skill may present the output inline. As another example, if the output does not relate to the presently displayed content, then the skill may present the output via a full-screen interface.

Teachings of the present disclosure may be configured to incorporate user permissions and may only be performed if approved by a user. As such, the systems, devices, components, and techniques described herein would be typically configured to restrict processing where appropriate and only process user data in a manner that ensures compliance with all appropriate laws, regulations, standards, and the like. The teachings of the present disclosure can be implemented on a geographic basis to ensure compliance with laws in various jurisdictions and entities in which the computing components and/or user are located.

FIG. 1 shows a system 100 configured to perform speech processing in view of multi-modal widgets presented at a device. As shown in FIG. 1, the system 100 may include a device 110, local to a user 105, and a system 120 connected across one or more networks 199. The network(s) 199 may include the Internet and/or any other wide- or local-area network, and may include wired, wireless, and/or cellular network hardware. Although the figures and discussion of the present disclosure illustrate certain steps in a particular order, the steps described may be performed in a different order (as well as certain steps removed or added) without departing from the present disclosure.

The system 120 may be a speech processing system configured to process spoken natural language inputs using ASR and NLU processing. The system 120 may include multiple components to facilitate speech processing, such as, an orchestrator component 130, an ASR component 150, a NLU component 160, a skill selection component 165, a skill request router 188, and one or more skill components 190. The system 120 may also include a profile storage 170, a TTS component 180, and a user recognition component 195 to facilitate processing of users inputs and generating outputs. One or more of the skill components 190 may be in (wired or wireless) communication with a skill system(s) 125 located remote/external to the system(s) 120.

The device 110 may display content via one or more multi-modal widgets 112. The content may include text, icons, images, video, selectable user interface elements (e.g., buttons, links, etc.), and the like. Each widget 112 may be associated with a same or different skill component 190.

Content at the widget 112 may be determined (including updated, refreshed, etc.) by the corresponding skill component 190.

The user 105 may select which multi-modal widgets are to display content at the device 110. The user 105 may select certain multi-modal widgets 112 to be active and presenting content continuously (e.g., on a daily basis). For example, the user 105 may select a weather multi-modal widget to be active daily, and the weather multi-modal widget may update weather content presented via the weather multi-modal widget. Such multi-modal widgets 112 may automatically activate after a reboot of the device 110.

Referring to FIG. 1, the user 105 may speak an input, and the device 110 may capture audio 107 representing the spoken input. For example, the user 105 may say "Alexa, add [item] to my shopping list" or "Alexa, show me weather for [city]." In other examples, the user 105 may provide another type of input (e.g., selection of a button, selection of displayed graphical interface elements, may perform a gesture, etc.). The device 110 may send (step 1) audio data (or other type of input data, such as, image data, text data, etc.) corresponding to the user input to the system 120 for processing. In particular, the orchestrator component 130 may receive the input data from the device 110.

Figure 2:
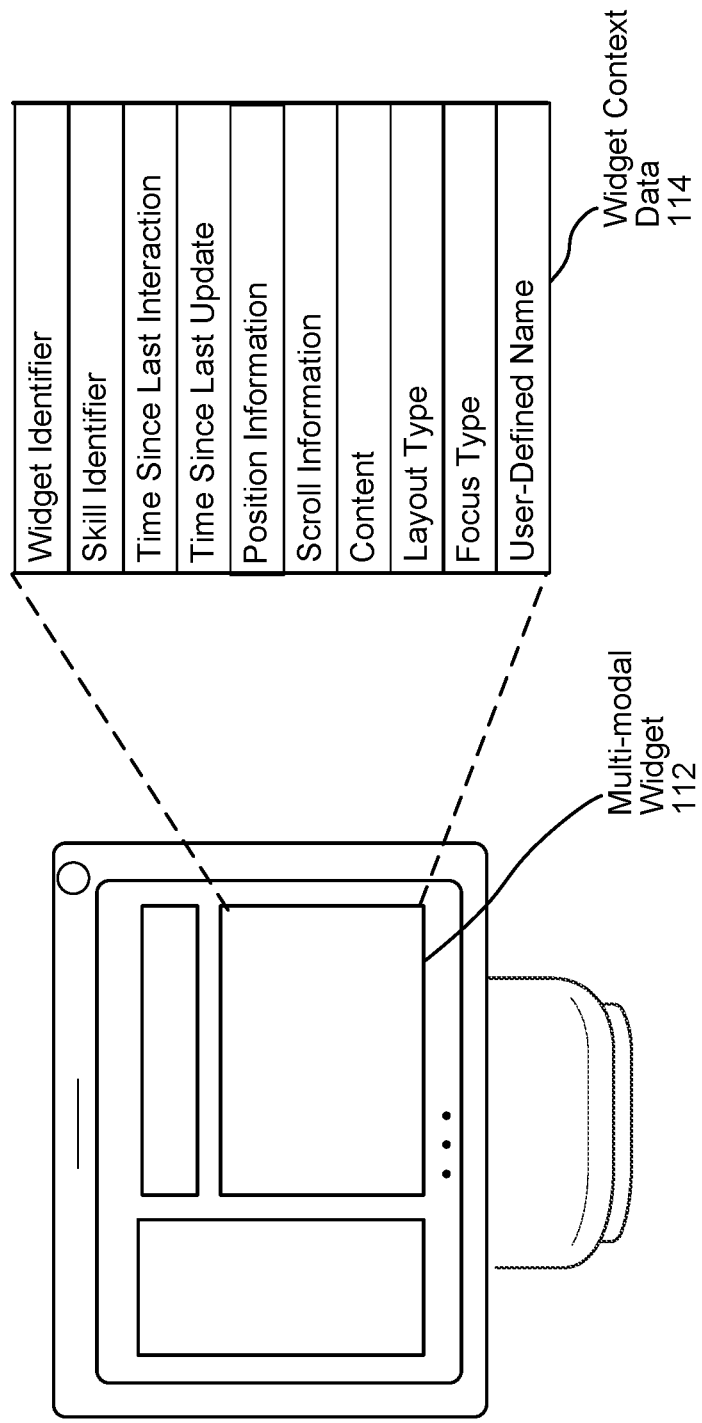
FIG. 2 conceptually illustrates example widget context data, according to embodiments of the present disclosure.

In response to receiving the user input from the user 105, the device 110 may also send (step 2) widget context data 114 to the system 120. The widget context data 114 may correspond to the multi-modal widgets 112 active at the device 110 (i.e., presenting content via the device 110 when the device 110 receives the user input). The widget context data 114 may include widget identifiers for the multi-modal widgets 112. In some embodiments, the widget context data 114 may also include a skill identifier associated with the skill component 190 corresponding to the multi-modal widget 112. For example, the widget context data 114 may include a first widget identifier for the multi-modal widget 112*a*, a first skill identifier corresponding to the multi-modal widget 112*a*, a second widget identifier for the multi-modal widget 112*b*, and a second skill identifier corresponding to the multi-modal widget 112*b*. FIG. 2 illustrates example data included in the widget context data 114 corresponding to the multi-modal widget 112. In some embodiments, the device 110 may send first widget context data 114*a* corresponding to the first multi-modal widget 112*a*, and may send separate second widget context data 114*b* corresponding to the second multi-modal widget 112*b*.

In some embodiments, the widget context data 114 may also include a time when the user 105 most recently/last interacted with the multi-modal widget 112 (as illustrated in FIG. 2). This time may be represented, in some embodiments, as time elapsed since the last interaction. The device 110 may store such information based on receiving user inputs (e.g., touch inputs, voice inputs, etc.) from the user 105 corresponding to the multi-modal widget 112.

In some embodiments, the widget context data 114 may also include a time when the multi-modal widget 112 was last updated (as illustrated in FIG. 2). This time may be based on the last time when content was updated at the multi-modal widget 112 or other data corresponding to the multi-modal widget 112 was updated (e.g., update multi-modal widget software, update multi-modal widget interface, etc.). For example, this time may be based on a last time when the device 110 received a command, from a skill component 190, to update the multi-modal widget 112.

In some embodiments, the widget context data 114 may also include information on where the multi-modal widget 112 is positioned (referred to as position information herein) on the display screen of the device 110 (as illustrated in FIG. 2). The position information may be indicated in terms of quadrants or portions. For example, the position information for the multi-modal widget 112*a* (in FIG. 1) may be "left side panel", and the position information for the multi-modal widget 112*b* (in FIG. 1) may be "center" or "bottom half." Other position information may be right side panel, top panel, bottom panel, center, bottom half, top half, etc. In other embodiments, the position information may be indicated as coordinates along x-axis and y-axis (e.g., x-y coordinates) or pixel coordinates corresponding to the display interface of the device 110. The coordinates may be a set of four coordinates, each one corresponding to a corner of the multi-modal widget.

The content displayed via the multi-modal widget 112 may be scrollable (i.e. the user 105 may be able to scroll up, scroll down, scroll left, or scroll right) to view different portions of the content. In some embodiments, the widget context data 114 may also include scroll information (as illustrated in FIG. 2).

The widget context data 114, in some embodiments, may also include content (as illustrated in FIG. 2) being displayed via the multi-modal widget 112 at the device 110 at the time the user input from the user 105 is received. Some multi-modal widgets 112 may not display an entirety of the content at the device 110 due to multi-modal widget size, screen size, etc. As such, the multi-modal widget 112 may display a portion of the content based on the multi-modal widget size and the screen size. For example, some multi-modal widgets may have multiple pages or tabs that the user 105 can select to view other portions of the content. As a further example, some multi-modal widgets may have a scroll bar so the user 105 can view other portions of the content. The widget context data 114 may include (or otherwise indicate) the portion of the content being displayed at the device 110, as it is viewable by the user 105.

The widget context data 114 may, in some embodiments, also include a layout type of the multi-modal widget 112 at the time the user input is received (as illustrated in FIG. 2). The layout type may be full screen (when the multi-modal widget is in a full-screen mode), overlay (when the multi-modal widget is overlaid over other multi-modal widgets), non-full screen, etc.

The widget context data 114, in some embodiments, may also include a focus type for the multi-modal widget 112 (as illustrated in FIG. 2). The focus type may be touch focus (when the user 105 touches the multi-modal widget 112 before or while providing the user input), visual focus (when the multi-modal widget 112 is visible on the display screen of the device 110 while the user 105 provides the user input), or non-visual focus (when the multi-modal widget 112 is active but not visible on the display screen of the device 110, and may be displayed on a different tab or page of the display screen of the device 110, or may be at least partially obscured by an overlaid multi-modal widget).

The widget context data 114, in some embodiments, may also include a user-defined name for the multi-modal widget 112 (as illustrated in FIG. 2). For example, the user 105 may name a shopping list multi-modal widget as [list 1]. The user 105 may provide a spoken input or a touch input to name the multi-modal widget 112.

In some embodiments, the information described above as being included in the widget context data 114 may be provided by the device 110. In other embodiments, some or all of the above described information may be determined by the system 120. For example, the device 110 may send the widget identifiers for the multi-modal widgets 112 presented at the device 110, and the system 120 may determine the content being presented via the multi-modal widgets 112. The system 120 may send a request to the skill component 190 corresponding to the multi-modal widget 112 to determine the content being presented via the multi-modal widget 112 associated with the widget identifier.

The orchestrator component 130 may store (step 3) the widget context data 114 in a widget session storage 142. The widget context data 114, in the widget session storage 142, may be associated with a device identifier for the device 110 and/or a user identifier for the user 105. The user identifier for the user 105 may be determined by the user recognition component 195 as described in detail below. The device identifier may be sent by the device 110 along with the widget context data 114, or with the input data corresponding to the user input from the user 105.

The widget session storage 142 may store historic widget context data corresponding to the user identifier associated with the user 105, and for user identifiers associated with other users. The historic widget context data may correspond to one or more multi-modal widgets that may have been previously active at the device 110, and may not be active currently. The historic widget context data may correspond to one or more multi-modal widgets that may have been enabled for the device 110, and may be currently disabled. In addition to the widget context data, the widget session storage 142 may also store interaction data corresponding to a multi-modal widget. Such interaction data may relate to user inputs received at the system 120 and corresponding to the multi-modal widget, output data generated by a skill component and corresponding to the multi-modal widget (i.e. output data presented via the multi-modal widget), NLU data corresponding to the user inputs, selected skill identifier, time the user input was received, etc. The widget session storage 142 may associate the widget context data and the corresponding interaction data with a widget session identifier in the storage 142. One or more components of the system 120 may use the data stored at the widget session storage 142 to perform its processing. For example, the skill selection component 165 may use the data stored at the widget session storage 142 (and corresponding to historic interactions between the user 105 and multi-modal widgets) to select a skill component for the instant user input (received in step 1). As another example, the NLU component 160 may use the data stored at the widget session storage 142 to determine NLU data corresponding to the instant user input.

In the case that the input data (received in step 1) is audio data, the orchestrator component 130 may send (step 4) the audio data to the ASR component 150, and the ASR component 150 may process the audio data to determine ASR data (e.g., token data, text data, one or more ASR hypotheses including token or text data and corresponding confidence scores, etc.) corresponding to the words spoken by the user 105. Details on how the ASR component 150 may process the audio data are described below. The ASR component may send (step 5) the ASR data to the orchestrator component 130.

In some embodiments, the orchestrator component 130 may also send (at step 4) the widget context data 114 to the ASR component 150. The ASR component 150 may use the widget context data 114 to perform ASR processing. For example, the ASR component 150 may employ one technique involving boosting of one or more words (represented as text or token data) included in the widget context data 114, such as, the name of the multi-modal widget 112, words included in the content presented at the multi-modal widget 112, etc. Using such as a technique may enable the ASR component 150 to recognize certain rare or personalized words that may be included in the spoken input from the user 105. In some embodiments, the ASR component 150 may determine embedding data corresponding to the words included in the widget context data 114, and use the embedding data to determine the ASR data corresponding to the audio data.

The orchestrator component 130 may send (step 6) the ASR data and the widget context data 114 to the NLU component 160. The NLU component 160 may determine NLU data corresponding to the user input, where the NLU data may include an intent and one or more entities. The NLU component 160 may use the widget context data 114 to determine the intent and/or the one or more entities. In some cases, the NLU component 160 may determine the intent based on which multi-modal widgets 112 are presented at the device 110. In some cases, the NLU component 160 may determine an entity based on the content being displayed at the multi-modal widget 112. In some cases, the NLU component 160 may determine the NLU data (intent and/or entity) based on the focus information for the multi-modal widget 112, content being displayed via the multi-modal widget 112, time of last interaction with the multi-modal widget 112, etc. For example, the device 110 may present a music multi-modal widget displaying information about a [song name], and the user 105 may say "Play song." In this example, the NLU component 160 may determine, using the ASR data corresponding to the spoken input and the widget context data 114, the following NLU data: {intent: <PlayMusic>; entity type: <SongName> entity: "[song name]"}. The entity [song name] may be based on the widget context data 114 indicating that the multi-modal widget 112 displaying information about the [song name]. In some embodiments, the widget context data 114 may be used to target certain Finite-state Transducers (FSTs) implemented by the NLU component 160. For example, the NLU component 160 may implement FSTs specific to certain skills, and based on the widget context data 114 indicating which multi-modal widgets 112, and in turn which skills, are active/enabled at the device 110, the NLU component 160 may use or boost the corresponding FSTs. Further details about how the NLU component 160 determines NLU data are described below in relation to FIG. 4. The NLU component 160 may send (step 7) the NLU data, corresponding to the user input, to the orchestrator component 130.

The orchestrator component 130 may send (step 8) the NLU data and the widget context data 114 to the skill selection component 165. The skill selection component 165 may be configured to determine which skill component 190 is capable of responding to the user input. The skill selection component 165 may make this determination based on which skill component 190 is capable of processing the intent and the entity data included in the NLU data. The skill selection component 165 may make this determination further based on the information included in the widget context data 114. In selecting the skill component 190, the skill selection component 165 may determine which particular multi-modal widget 112 the user input corresponds to. Based on determining which multi-modal widget 112 the user input corresponds to, the skill selection component 165 may select the skill component 190 to respond to the user input. In some embodiments, the skill selection component 165 may select the skill component 190 associated with the skill identifier included in the widget context data 114 as corresponding to the multi-modal widget 112. For example, if the skill selection component 165 determines that the user input corresponds to the multi-modal widget 112a, then the skill selection component 165 may select the skill component 190a associated with the first skill identifier corresponding to the multi-modal widget 112a (as indicated in the widget context data 114).

The skill selection component 165 may determine which multi-modal widget 112 corresponds to the user input based on the intent and/or the entity included in the NLU data. For example, if the intent is <PlayMusic>, then the skill selection component 165 may determine that the music multi-modal widget, presented at the device 110, corresponds to the user input.

In some cases, the device 110 may present multiple instances of the same multi-modal widget. In some embodiments, the skill selection component 165 may determine which multi-modal widget instance corresponds to the user input. The skill selection component 165 may make this determination based on the content displayed via each multi-modal widget instance, the content that is visible on the device screen when the user 105 provided the user input, the time since last interaction, the focus information for the multi-modal widget, user-defined name, and/or other information included in the widget context data 114. For example, the multi-modal widgets 112a and 112b may be different instances of a shopping list multi-modal widget, and the user 105 may say "remove [item] from my list." In this example, the skill selection component 165 may determine that the content displayed via the multi-modal widget 112a includes the [item], and may select the multi-modal widget 112a as corresponding to the user input. In another example, a first list at a first instance of a shopping list multi-modal widget may be named by the user 105 [list 1], a second list at a second instance of the shopping list multi-modal widget may be named by the user 105 [list 2], and the user 105 may say "add [item] to my [list 1]." In this example, the skill selection component 165 may determine that the user input corresponds to the first shopping list multi-modal widget.

In some embodiments, the skill selection component 165 may output a widget identifier associated with the multi-modal widget 112 that is determined to correspond to the user input. In some embodiments, the skill selection component 165 may output more than one widget identifier if the skill selection component 165 determines the user input corresponds to more than one multi-modal widget 112.

The skill selection component 165 may send (step 9) a skill identifier associated with the skill component 190 to the orchestrator component 130. In some embodiments, the skill selection component 165 may also send a widget identifier associated with the multi-modal widget 112 determined to correspond to the user input.

The orchestrator component 130 may send (step 10) the skill identifier, the widget identifier and the NLU data to the skill request router component 188. The orchestrator component 130 may also send a command to the skill request router component 188 to send the NLU data to the skill component 190 associated with the skill identifier, so that the skill component 190 may process with respect to the user input.

In some embodiments, the skill request router component 188 may determine whether data, to be sent to the skill component 190 and indicated by the orchestrator component 130, is appropriate to send to the skill component 190. As described herein, the system 120 may implement more than one skill component 190, each of which may be configured to perform certain functionalities. When a particular skill component 190a is to be invoked for a user input, the other skill components 190 are not to be invoked and are not to receive the NLU data or other data corresponding to the user input.

In some embodiments, the orchestrator component 130 may also send the widget context data 114 to the skill request router component 188 for sending to the skill component 190. The skill request router component 188 may determine which portion of the widget context data 114 is to be sent to the skill component 190. As described herein, the widget context data 114 may include data corresponding to all multi-modal widgets 112 active or enabled at the device 110. The skill request router component 188 may determine widget context data 116 to be a portion of the widget context data 114 that corresponds to the widget identifier and/or the skill identifier received from the orchestrator component 130 at step 10. In this manner, the skill request router 188 may not send, to the skill component 190, all the content being presented at the device 110. This may prevent the skill component 190 from being able to identify content being presented at the device 110 and which the skill component 190 does not need to process (e.g., multi-modal widget content corresponding to a different skill component).

As used herein, a multi-modal widget may be "active" when the multi-modal widget is presenting content at the device 110. In other words, when the user 105 adds the multi-modal widget to a GUI (e.g., home screen, another tab, etc.) of the device 110. In some cases, the GUI of the device 110 may include multiple tabs or pages that the user 105 can scroll or switch to view other content. The user 105 may add one or more multi-modal widgets to a first tab/page, and add other multi-modal widgets to another tab/page.

As used herein, a multi-modal widget may be enabled/installed when the user 105 downloads a multi-modal widget to the device 110. Such enabled/installed multi-modal widgets may not present content via the device 110 till the user 105 adds the multi-modal widget to the GUI of the device 110.

In some embodiments, the functionalities described herein may take into consideration active multi-modal widgets to determine NLU data corresponding to a user input and select a skill component 190 to respond to the user input. In some embodiments, the functionalities described herein may also take into consideration enabled/installed multi-modal widgets. For example, the user 105 may say "add [multi-modal widget name] to the home screen," in which case the NLU component 160 may determine entity data to be [multi-modal widget name] which may correspond to one of the enabled/installed multi-modal widgets, and the skill selection component 165 may select the skill component 190 corresponding to the particular enabled/installed multi-modal widget.

In some embodiments, the skill component 190 may store/track content data being presented via the multi-modal widget 112 at the device 110. For example, the skill component 190 may store the content data when the content data is sent (via the orchestrator 130) to the device 110 for output via the multi-modal widget 112. In some cases, the multi-modal widget 112 may be scrollable or may update dynamically (e.g., update content based on time, etc.). In such cases, the content presently displayed at the device 110 and presently visible to the user 105 may be a portion of the content data that the skill component 190 is storing/tracking. For example, the skill component 190 may send weather data corresponding to multiple days for display via a weather multi-modal widget. The weather multi-modal widget may have a first view/tab that displays weather for the present day, a second view/tab that displays weather for the next day, and third view/tab that displays weather for multiple days. The user 105 may select, for example, the first view/tab, and thus weather data for the present day (which is a portion of the weather data sent by the skill component 190) may be visible to the user 105. In such cases, the device 110 is able to provide the presently visible content data, via the widget context data 114, to the system 120, which the skill component 190 (and other components of the system 120) may use for processing.

The skill request router component 188 may send (step 11) the NLU data corresponding to the user input, the widget context data 116, the widget identifier, and a command to process with respect to the NLU data to the skill component 190. The skill component 190 may determine an output responsive to the user input based on the NLU data. In some embodiments, the skill component 190 may determine how the output is to be presented to the user 105. Such determination may be based on the widget context data 116 and the widget identifier. For example, the skill component 190 may determine that the output is to be presented via the multi-modal widget 112 associated with the widget identifier. As another example, the skill component 190 may determine to launch another multi-modal widget at the device 110 to present the output. As yet another example, the skill component 190 may determine to present the output via a full-screen interface, where the full-screen interface may cause one or more of the multi-modal widgets 112 to appear in the background, or the full-screen interface may be presented on another tab/page of the display screen of the device 110. As yet another example, the skill component 190 may determine to present the output via an overlay interface that may be presented on-top of the multi-modal widgets 112 and may cover one or more of the multi-modal widgets 112 or cover portions of one or more of the multi-modal widgets 112.

The skill component 190 may also determine a type of output to be presented to the user 105. For example, the skill component 190 may determine to present an audio-only output, a visual-only output (including text, image, video, icons, other graphical interface elements, etc.), or an audio-visual output. In some cases, the skill component 190 may determine to output a natural language output. In such cases, the skill component 190 may send text data or SSML tagged data, corresponding to the natural language output, to the orchestrator component 130. The text data or SSML tagged data may be processed using the TTS component 180 to generate audio data representing synthesized speech, as described in detail below.

The skill component 190 may send (step 12) output data responsive to the user input to the orchestrator component 130. The skill component 190 may also send (to the orchestrator component 130) an indication of how the output data is to be presented to the user 105 and/or the type of output to be presented to the user 105. The orchestrator component 130 may send (step 13) the output data to the device 110, along with a directive/command that causes the device 110 to present the output in the manner specified by the skill component 190. For example, if the indication from the skill component 190 indicates the output is to be presented via the multi-modal widget 112a, then, in response to receiving the output data from the orchestrator 130, the device 110 may update the content of the multi-modal widget 112a. As another example, if the indication from the skill component 190 indicates the output is to be presented via a full-screen interface, then, in response to receiving the output data from the orchestrator 130, the device 110 may launch a full-screen interface to present the output data. The skill component 190, in some embodiments, may send (at step 12) an APL document including the output data, and the indication of how the output data is to be presented.

In this manner, the system 120 may determine NLU data and may select a skill component corresponding to a user input using widget context data corresponding to one or more multi-modal widgets being presented at the device 110 that captures the user input.

The widget context data 114 may be provided by the device 110 to the system 120 each time a user input is received and sent to the system 120. In some cases, the widget context data 114 may remain the same between user inputs, if content at the multi-modal widgets 112 has not updated. In some cases, the widget context data 114 may remain the same after the device 110 is rebooted (restarted) if the content at the multi-modal widgets 112 has not updated.

Each skill component 190 may have multiple multi-modal widgets to provide different or related functionalities. The device 110 may present multiple instances of the same multi-modal widget. In some embodiments, each multi-modal widget 112 may be associated with a widget instance identifier, a widget identifier, and a skill identifier. In some embodiments, the skill selection component 165 may determine the widget instance identifier and the widget identifier corresponding to the user input, and may send the widget instance identifier and the widget identifier to the orchestrator component 130.

In some embodiments, the widget context data 114, sent by the device 110 to the system 120, may include context data corresponding to multi-modal widgets that are not active at the device 110 but are installed or enabled, by the user 105, at the device 110.

In some embodiments, a component of the system 120 may request context data to perform its processing. Such context data may include a device identifier for the device 110, user identifier for the user 105, profile data for the user 105 from the profile storage 170, time the user input is received, device location, etc. Such context data may also include widget context data 114 stored at the widget session storage 142.

In some embodiments, the system 120 may initiate a skill session when a user input from the user 105 is received. The skill session may be used to track data determined during processing of the user input, context data corresponding to the user input, and other data. The skill session may be active while the system 120 is processing with respect to the user input. Once the system 120 presents an output responsive to the user input (e.g., at step 13) the skill session may be terminated.

In some embodiments, the system 120 may initiate a widget session when the multi-modal widget 112 is enabled at the device 110. In other embodiments, the system 120 may initiate a widget session when the multi-modal widget 112 is active on the display screen of the device 110. In some embodiments, the device 110 may send the widget context data 114 when the multi-modal widget 112 becomes enabled or active at the device 110. The system 120 may store the widget context data 114 in the widget session storage 142, associated with the device identifier for the device 110 and/or the user identifier for the user 105. While the multi-modal widget 112 is installed/enabled or is active, the widget session may be active. When the multi-modal widget 112 is disabled or is no longer active at the display screen of the device 110, the widget session may be terminated. The widget session may be used to track widget context data corresponding to the multi-modal widget 112. The widget context data may be updated/refreshed when the multi-modal widget 112 is updated at the device 110 (e.g., with respect to content, display position, receipt of user input, etc.). Other components of the system 120 may request the widget context data to perform processing. In some cases, a lifecycle of a widget session may be longer than a skill session, as the skill session may terminate when an interaction ends (e.g., the system presents an output responsive to a user input), while the widget session may terminate when the multi-modal widget is disabled or no longer active at the device 110.

In some embodiments, the data stored at the widget session storage 142 (and corresponding to historic interactions between the user 105 and the multi-modal widgets 112) may be used by the NLU component 160 and the skill selection component 165 to determine how to respond to a user input corresponding to a multi-modal widget. For example, the user 105 may say "save that recipe" intending to save a recipe being displayed via the multi-modal widget 112a at the device 110. Based on processing the user input as described herein, the system 120 performs the action of saving the recipe displayed at the multi-modal widget 112a. Subsequently (after some time after saying "save that recipe") the user 105 may say "unsave that recipe" or "delete that recipe, I changed my mind" or other similar inputs. In this case, the NLU component 160 may determine a "reverse action" or "undo action" intent corresponding to the subsequent user input. Using the data stored at the widget session storage 142, the NLU component 160 may determine that the intent corresponds to the multi-modal widget 112a based on the historic interaction data indicating that a recipe was previously saved with respect to the multi-modal widget 112a. The skill selection component 165 may select the skill component 190, corresponding to the multi-modal widget 112a, to respond to the subsequent user input (e.g., perform the action of deleting the recipe).

The system 120 may use other components illustrated in FIG. 1. The various components shown in FIG. 1 may be located on a same or different physical devices. Communication between various components may occur directly or across the network(s) 199.

A microphone or array of microphones (of or otherwise associated with the device 110) may capture audio. The device 110 processes audio data, representing the audio, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data, the energy levels of the audio data in one or more spectral bands, the signal-to-noise ratios of the audio data in one or more spectral bands, or other quantitative aspects. In other examples, the device 110 may implement a classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data, the device 110 may determine if the speech is directed at the device 110/system 120. In at least some embodiments, such determination may be made using a wakeword detection component 320 (shown in FIG. 3). The wakeword detection component 320 may be configured to detect various wakewords. In at least some examples, each wakeword may correspond to a name of a different digital assistant. An example wakeword/digital assistant name is "Alexa."

Wakeword detection is typically performed without performing linguistic analysis, textual analysis, or semantic analysis. Instead, the audio data is analyzed to determine if specific characteristics of the audio data match preconfigured acoustic waveforms, audio signatures, or other data corresponding to a wakeword.

Thus, the wakeword detection component 320 may compare audio data to stored data to detect a wakeword. One approach for wakeword detection applies general large vocabulary continuous speech recognition (LVCSR) systems to decode audio signals, with wakeword searching being conducted in the resulting lattices or confusion networks. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid deep neural network (DNN)-HMM decoding framework. In another example, the wakeword detection component 320 may be built on DNN/recursive neural network (RNN) structures directly, without HMM being involved. Such an architecture may estimate the posteriors of wakewords with context data, either by stacking frames within a context window for DNN, or using RNN. Follow-on posterior threshold tuning or smoothing is applied for decision making. Other techniques for wakeword detection, such as those known in the art, may also be used.

Once the wakeword detection component 320 detects a wakeword, the device 110 may "wake" and begin transmitting audio data 311, representing the audio, to the system 120. The audio data 311 may include the detected wakeword, or the device 110 may remove the portion of the audio data, corresponding to the detected wakeword, prior to sending the audio data 311 to the system 120.

Referring to FIG. 1, the orchestrator component 130 may be configured to, among other things, coordinate data transmissions between components of the system 120. The orchestrator component 130 may receive audio data from the device 110, and send the audio data to the ASR component 150.

The ASR component 150 transcribes the audio data into ASR output data including one or more ASR hypotheses. An ASR hypothesis may be configured as a textual interpretation of the speech in the audio data, or may be configured in another manner, such as one or more tokens. Each ASR hypothesis may represent a different likely interpretation of the speech in the audio data. Each ASR hypothesis may be associated with a score (e.g., confidence score, probability score, or the like) representing the associated ASR hypothesis correctly represents the speech in the audio data.

The ASR component 150 interprets the speech in the audio data based on a similarity between the audio data and pre-established language models. For example, the ASR component 150 may compare the audio data 311 with models for sounds (e.g., subword units, such as phonemes, etc.) and sequences of sounds to identify words that match the sequence of sounds of the speech represented in the audio data.

In at least some instances, instead of the device 110 receiving a spoken natural language input, the device 110 may receive a textual (e.g., types) natural language input. The device 110 may determine text data representing the textual natural language input, and may send the text data to the system 120, wherein the text data is received by the orchestrator component 130. The orchestrator component 130 may send the text data or ASR output data, depending on the type of natural language input received, to the NLU component 160.

The NLU component 160 processes the ASR output data or text data to determine one or more NLU hypotheses embodied in NLU output data. The NLU component 160 may perform intent classification (IC) processing on the ASR output data or text data to determine an intent of the natural language input. An intent corresponds to an action to be performed that is responsive to the natural language input. To perform IC processing, the NLU component 160 may communicate with a database of words linked to intents. For example, a music intent database may link words and phrases such as "quiet," "volume off," and "mute" to a <Mute> intent. The NLU component 160 identifies intents by comparing words and phrases in ASR output data or text data to the words and phrases in an intents database. In some embodiments, the NLU component 160 may communicate with multiple intents databases, with each intents database corresponding to one or more intents associated with a particular skill.

For example, IC processing of the natural language input "play my workout playlist" may determine an intent of <PlayMusic>. For further example, IC processing of the natural language input "call mom" may determine an intent of <Call>. In another example, IC processing of the natural language input "call mom using video" may determine an intent of <VideoCall>. In yet another example, IC processing of the natural language input "what is today's weather" may determine an intent of <OutputWeather>.

The NLU component 160 may also perform named entity recognition (NER) processing on the ASR output data or text data to determine one or more portions, sometimes referred to as slots, of the natural language input that may be needed for post-NLU processing (e.g., processing performed by a skill). For example, NER processing of the natural language input "play [song name]" may determine an entity type of "SongName" and an entity value corresponding to the indicated song name. For further example, NER processing of the natural language input "call mom" may determine an entity type of "Recipient" and an entity value corresponding to "mom." In another example, NER processing of the natural language input "what is today's weather" may determine an entity type of "Date" and an entity value of "today."

In at least some embodiments, the intents identifiable by the NLU component 160 may be linked to one or more grammar frameworks with entity types to be populated with entity values. Each entity type of a grammar framework corresponds to a portion of ASR output data or text data that the NLU component 160 believes corresponds to an entity value. For example, a grammar framework corresponding to a <PlayMusic> intent may correspond to sentence structures such as "Play {Artist Name}," "Play {Album Name}," "Play {Song name}," "Play {Song name} by {Artist Name}," etc.

For example, the NLU component 160 may perform NER processing to identify words in ASR output data or text data as subject, object, verb, preposition, etc. based on grammar rules and/or models. Then, the NLU component 160 may perform IC processing using the identified verb to identify an intent. Thereafter, the NLU component 160 may again perform NER processing to determine a grammar model associated with the identified intent. For example, a grammar model for a <PlayMusic> intent may specify a list of entity types applicable to play the identified "object" and any object modifier (e.g., a prepositional phrase), such as {Artist Name}, {Album Name}, {Song name}, etc. The NER processing may then involve searching corresponding fields in a lexicon, attempting to match words and phrases in the ASR output data that NER processing previously tagged as a grammatical object or object modifier with those identified in the lexicon.

NER processing may include semantic tagging, which is the labeling of a word or combination of words according to their type/semantic meaning. NER processing may include parsing ASR output data or text data using heuristic grammar rules, or a model may be constructed using techniques such as hidden Markov models, maximum entropy models, log linear models, conditional random fields (CRFs), and the like. For example, NER processing with respect to a music skill may include parsing and tagging ASR output data or text data corresponding to "play mother's little helper by the rolling stones" as {Verb}: "Play," {Object}: "mother's little helper," {Object Preposition}: "by," and {Object Modifier}: "the rolling stones." The NER processing may identify "Play" as a verb based on a word database associated with the music skill, which IC processing determines corresponds to a <PlayMusic> intent.

The NLU component 160 may generate NLU output data including one or more NLU hypotheses, with each NLU hypothesis including an intent and optionally one or more entity types and corresponding entity values. In some embodiments, the NLU component 160 may perform IC processing and NER processing with respect to different skills. One skill may support the same or different intents than another skill. Thus, the NLU output data may include multiple NLU hypotheses, with each NLU hypothesis corresponding to IC processing and NER processing performed on the ASR output or text data with respect to a different skill.

As described above, the system 120 may perform speech processing using two different components (e.g., the ASR component 150 and the NLU component 160). In at least some embodiments, the system 120 may implement a spoken language understanding (SLU) component configured to process audio data 311 to determine NLU output data.

The SLU component may be equivalent to a combination of the ASR component 150 and the NLU component 160. Yet, the SLU component may process audio data 311 and directly determine the NLU output data, without an intermediate step of generating ASR output data. As such, the SLU component may take audio data 311 representing a spoken natural language input and attempt to make a semantic interpretation of the spoken natural language input. That is, the SLU component may determine a meaning associated with the spoken natural language input and then implement that meaning. For example, the SLU component may interpret audio data 311 representing a spoken natural language input in order to derive a desired action. The SLU component may output a most likely NLU hypothesis, or multiple NLU hypotheses associated with respective confidence or other scores (such as probability scores, etc.).

The system 120 may include one or more skill components 190 and/or may communicate with one or more skills 125. A "skill" may refer to software, that may be placed on a machine or a virtual machine (e.g., software that may be launched in a virtual instance when called), configured to process NLU output data and perform one or more actions in response thereto. For example, for NLU output data including a <PlayMusic> intent, an "artist" entity type, and an artist name as an entity value, a music skill may be called to output music sung by the indicated artist. For further example, for NLU output data including a <TurnOn> intent, a "device" entity type, and an entity value of "lights," a smart home skill may be called to cause one or more "smart" lights to operate in an "on" state. In another example, for NLU output data including an <OutputWeather> intent, a "location" entity type, and an entity value corresponding to a geographic location of the device 110, a weather skill may be called to output weather information for the geographic location. For further example, for NLU output data including a <BookRide> intent, a taxi skill may be called to book a requested ride. In another example, for NLU output data including a <BuyPizza> intent, a restaurant skill may be called to place an order for a pizza.

A skill component 190 may operate in conjunction between the system 120 and other devices, such as the device 110, a restaurant electronic ordering system, a taxi electronic booking system, etc. in order to complete certain functions. Inputs to a skill component 190 may come from speech processing interactions or through other interactions or input sources.

A skill component 190 may be associated with a domain, a non-limiting list of which includes a smart home domain, a music domain, a video domain, a weather domain, a communications domain, a flash briefing domain, a shopping domain, and a custom domain.

The system 120 may include a TTS component 180 that generates audio data including synthesized speech. The data input to the TTS component 180 may come from a skill component 190, the orchestrator component 130, or another component of the system 120. The data input to the TTS component 180 may be text data or synthesized speech markup language (SSML) tagged data.

In one method of synthesis called unit selection, the TTS component 180 matches input data against a database of recorded speech. The TTS component 180 selects matching units of recorded speech and concatenates the units together to form audio data. In another method of synthesis called parametric synthesis, the TTS component 180 varies parameters such as frequency, volume, and noise to determine audio data including an artificial speech waveform. Parametric synthesis uses a computerized voice generator, sometimes called a vocoder.

The system 120 may include a user recognition component 195. The user recognition component 195 may recognize one or more users using various data. The user recognition component 195 may take as input the audio data 311. The user recognition component 195 may perform user recognition by comparing speech characteristics, in the audio data 311, to stored speech characteristics of users. The user recognition component 195 may additionally or alternatively perform user recognition by comparing biometric data (e.g., fingerprint data, iris data, retina data, etc.), received by the system 120 in correlation with a natural language input, to stored biometric data of users. The user recognition component 195 may additionally or alternatively perform user recognition by comparing image data (e.g., including a representation of at least a feature of a user), received by the system 120 in correlation with a natural language input, with stored image data including representations of features of different users. The user recognition component 195 may perform other or additional user recognition processes, including those known in the art. For a particular natural language input, the user recognition component 195 may perform processing with respect to stored data of users associated with the device 110 that received the natural language input.

The user recognition component 195 determines whether a natural language input originated from a particular user. For example, the user recognition component 195 may determine a first value representing a likelihood that a natural language input originated from a first user, a second value representing a likelihood that the natural language input originated from a second user, etc. The user recognition component 195 may also determine an overall confidence regarding the accuracy of user recognition processing.

The user recognition component 195 may output a single user identifier corresponding to the most likely user that originated the natural language input. Alternatively, the user recognition component 195 may output multiple user identifiers (e.g., in the form of an N-best list) with respective values representing likelihoods of respective users originating the natural language input. The output of the user recognition component 195 may be used to inform NLU processing, processing performed by a skill 125, as well as processing performed by other components of the system 120 and/or other systems.

The system 120 may include profile storage 170. The profile storage 170 may include a variety of data related to individual users, groups of users, devices, etc. that interact with the system 120. As used herein, a "profile" refers to a set of data associated with a user, group of users, device, etc. The data of a profile may include preferences specific to the user, group of users, device, etc.; input and output capabilities of one or more devices; internet connectivity data; user bibliographic data; subscription data; skill enablement data; and/or other data.

The profile storage 170 may include one or more user profiles. Each user profile may be associated with a different user identifier. Each user profile may include various user identifying data (e.g., name, gender, address, language(s), etc.). Each user profile may also include preferences of the user. Each user profile may include one or more device identifiers, each representing a respective device registered to the user. Each user profile may include skill identifiers of skills 125 that the user has enabled. When a user enables a skill 125, the user is providing the system 120 with permission to allow the skill 125 to execute with respect to the user's natural language inputs. If a user does not enable a skill 125, the system 120 may not execute the skill 125 with respect to the user's natural language inputs.

The profile storage 170 may include one or more group profiles. Each group profile may be associated with a different group identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, a user profile may include preferences unique from one or more other user profiles associated with the same group profile. A user profile may be a stand-alone profile or may be associated with a group profile. A group profile may be associated with (or include) one or more device profiles corresponding to one or more devices associated with the group profile.

The profile storage 170 may include one or more device profiles. Each device profile may be associated with a different device identifier. A device profile may include various device identifying data, input/output characteristics, networking characteristics, etc. A device profile may also include one or more user identifiers, corresponding to one or more user profiles associated with the device profile. For example, a household device's profile may include the user identifiers of users of the household.

Figure 3:
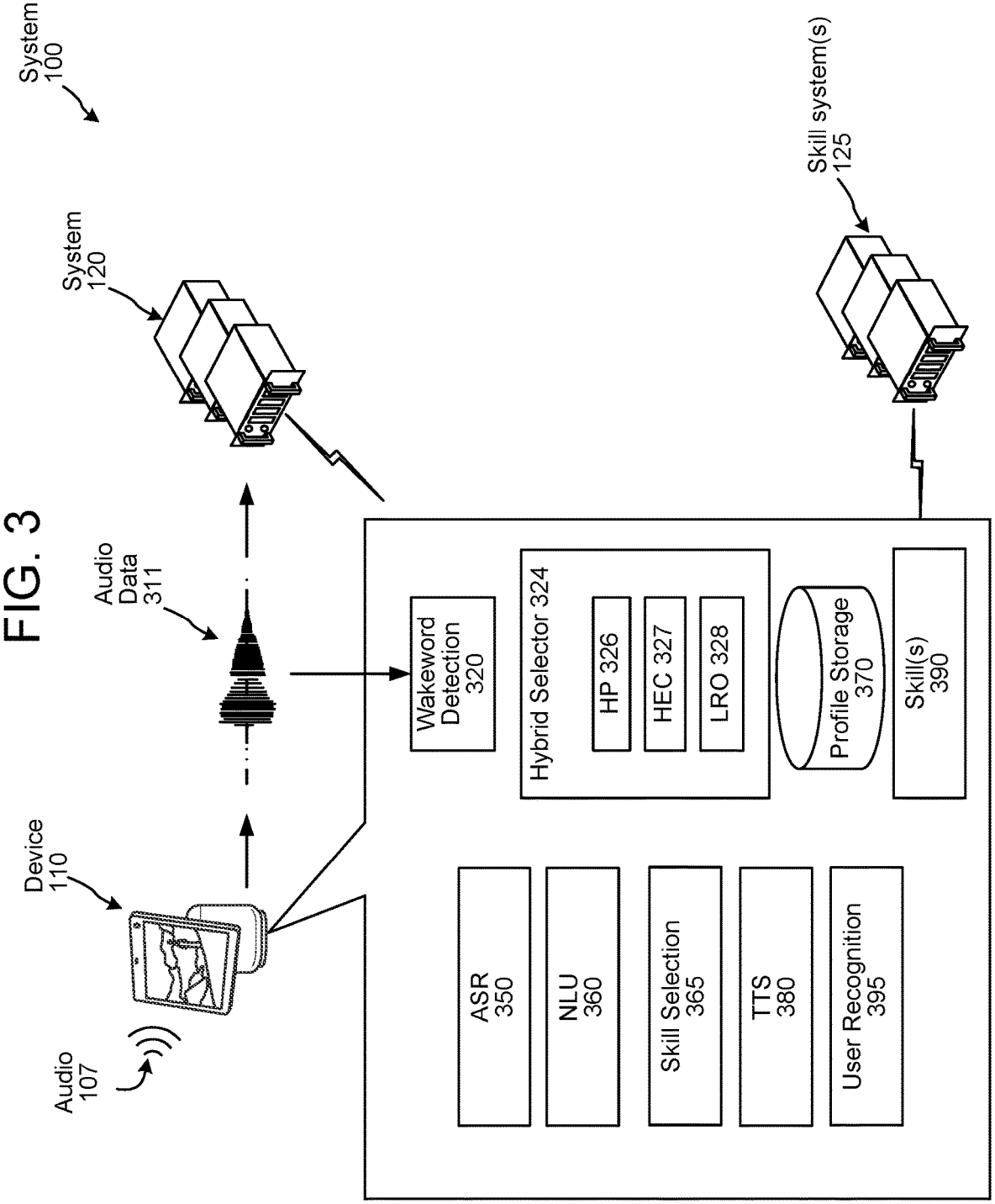
FIG. 3 is a conceptual diagram illustrating components that may be included in a device, according to embodiments of the present disclosure.

The foregoing describes illustrative components and processing of the system 120. The following describes illustrative components and processing of the device 110. As illustrated in FIG. 3, in at least some embodiments the system 120 may receive audio data 311 from the device 110, to recognize speech corresponding to a spoken natural language in the received audio data 311, and to perform functions in response to the recognized speech. In at least some embodiments, these functions involve sending directives (e.g., commands), from the system 120 to the device 110 to cause the device 110 to perform an action, such as output synthesized speech (responsive to the spoken natural language input) via a loudspeaker(s), and/or control one or more secondary devices by sending control commands to the one or more secondary devices.

Thus, when the device 110 is able to communicate with the system 120 over the network(s) 199, some or all of the functions capable of being performed by the system 120 may be performed by sending one or more directives over the network(s) 199 to the device 110, which, in turn, may process the directive(s) and perform one or more corresponding actions. For example, the system 120, using a remote directive that is included in response data (e.g., a remote response), may instruct the device 110 to output synthesized speech via a loudspeaker(s) of (or otherwise associated with) the device 110, to output content (e.g., music) via the loudspeaker(s) of (or otherwise associated with) the device 110, to display content on a display of (or otherwise associated with) the device 110, and/or to send a directive to a secondary device (e.g., a directive to turn on a smart light). It will be appreciated that the system 120 may be configured to provide other functions in addition to those discussed herein, such as, without limitation, providing step-by-step directions for navigating from an origin location to a destination location, conducting an electronic commerce transaction on behalf of the user 105 as part of a shopping function, establishing a communication session (e.g., an audio or video call) between the user 105 and another user, and so on.

The device 110 may include a wakeword detection component 320 configured to detect a wakeword (e.g., "Alexa") that indicates to the device 110 that the audio data 311 is to be processed for determining NLU output data. In at least some embodiments, a hybrid selector 324, of the device 110, may send the audio data 311 to the wakeword detection component 320. If the wakeword detection component 320 detects a wakeword in the audio data 311, the wakeword detection component 320 may send an indication of such detection to the hybrid selector 324. In response to receiving the indication, the hybrid selector 324 may send the audio data 311 to the system 120 and/or an on-device ASR component 150. The wakeword detection component 320 may also send an indication, to the hybrid selector 324, representing a wakeword was not detected. In response to receiving such an indication, the hybrid selector 324 may refrain from sending the audio data 311 to the system 120, and may prevent the on-device ASR component 150 from processing the audio data 311. In this situation, the audio data 311 can be discarded.

The device 110 may conduct its own speech processing using on-device language processing components (such as an on-device SLU component, an on-device ASR component 350, and/or an on-device NLU component 360) similar to the manner discussed above with respect to the speech processing system-implemented ASR component 150, and NLU component 160. The device 110 may also internally include, or otherwise have access to, other components such as one or more skills 190, a user recognition component 395 (configured to process in a similar manner to the user recognition component 195), profile storage 370 (configured to store similar profile data to the profile storage 170), a TTS component 380 (configured to process in a similar manner to the TTS component 180), one or more skill component(s) 390 (configured to process in a similar manner to the skill component(s) 190), and other components. In at least some embodiments, the on-device profile storage 370 may only store profile data for a user or group of users specifically associated with the device 110.

In at least some embodiments, the on-device language processing components may not have the same capabilities as the language processing components implemented by the system 120. For example, the on-device language processing components may be configured to handle only a subset of the natural language inputs that may be handled by the speech processing system-implemented language processing components. For example, such subset of natural language inputs may correspond to local-type natural language inputs, such as those controlling devices or components associated with a user's home. In such circumstances the on-device language processing components may be able to more quickly interpret and respond to a local-type natural language input, for example, than processing that involves the system 120. If the device 110 attempts to process a natural language input for which the on-device language processing components are not necessarily best suited, the NLU output data, determined by the on-device components, may have a low confidence or other metric indicating that the processing by the on-device language processing components may not be as accurate as the processing done by the system 120.

The hybrid selector 324, of the device 110, may include a hybrid proxy (HP) 326 configured to proxy traffic to/from the system 120. For example, the HP 326 may be configured to send messages to/from a hybrid execution controller (HEC) 327 of the hybrid selector 324. For example, command/directive data received from the system 120 can be sent to the HEC 327 using the HP 326. The HP 326 may also be configured to allow the audio data 311 to pass to the system 120 while also receiving (e.g., intercepting) this audio data 311 and sending the audio data 311 to the HEC 327.

In at least some embodiments, the hybrid selector 324 may further include a local request orchestrator (LRO) 328 configured to notify the on-device ASR component 150 about the availability of the audio data 311, and to otherwise initiate the operations of on-device language processing when the audio data 311 becomes available. In general, the hybrid selector 324 may control execution of on-device language processing, such as by sending "execute" and "terminate" events/instructions. An "execute" event may instruct a component to continue any suspended execution (e.g., by instructing the component to execute on a previously-determined intent in order to determine a directive). Meanwhile, a "terminate" event may instruct a component to terminate further execution, such as when the device 110 receives directive data from the system 120 and chooses to use that remotely-determined directive data.

Thus, when the audio data 311 is received, the HP 326 may allow the audio data 311 to pass through to the system 120 and the HP 326 may also input the audio data 311 to the on-device ASR component 150 by routing the audio data 311 through the HEC 327 of the hybrid selector 324, whereby the LRO 328 notifies the on-device ASR component 150 of the audio data 311. At this point, the hybrid selector 324 may wait for response data from either or both the system 120 and/or the on-device language processing components. However, the disclosure is not limited thereto, and in some examples the hybrid selector 324 may send the audio data 311 only to the on-device ASR component 150 without departing from the disclosure. For example, the device 110 may process the audio data 311 on-device without sending the audio data 311 to the system 120.

The on-device ASR component 350 is configured to receive the audio data 311 from the hybrid selector 324, and to recognize speech in the audio data 311, and the on-device NLU component 3 60 is configured to determine an intent from the recognized speech (an optionally one or more named entities), and to determine how to act on the intent by generating NLU output data that may include directive data (e.g., instructing a component to perform an action). In some cases, a directive may include a description of the intent (e.g., an intent to turn off {device A}). In some cases, a directive may include (e.g., encode) an identifier of a second device(s), such as kitchen lights, and an operation to be performed at the second device(s). Directive data may be formatted using Java, such as JavaScript syntax, or JavaScript-based syntax. This may include formatting the directive using JSON. In at least some embodiments, a device-determined directive may be serialized, much like how remotely-determined directives may be serialized for transmission in data packets over the network(s) 199. In at least some embodiments, a device-determined directive may be formatted as a programmatic application programming interface (API) call with a same logical operation as a remotely-determined directive. In other words, a device-determined directive may mimic a remotely-determined directive by using a same, or a similar, format as the remotely-determined directive.

A NLU hypothesis (output by the on-device NLU component 360) may be selected as usable to respond to a natural language input, and local response data may be sent (e.g., local NLU output data, local knowledge base information, internet search results, and/or local directive data) to the hybrid selector 324, such as a "ReadyToExecute" response. The hybrid selector 324 may then determine whether to use directive data from the on-device components to respond to the natural language input, to use directive data received from the system 120, assuming a remote response is even received (e.g., when the device 110 is able to access the system 120 over the network(s) 199), or to determine output data requesting additional information from the user 105.

The device 110 and/or the system 120 may associate a unique identifier with each natural language input. The device 110 may include the unique identifier when sending the audio data 311 to the system 120, and the response data from the system 120 may include the unique identifier to identify to which natural language input the response data corresponds.

In at least some embodiments, the device 110 may include one or more skill components 190. The skill component(s) 190 installed on (or in communication with) the device 110 may include, without limitation, a smart home skill and/or a device control skill configured to control a second device(s), a music skill configured to output music, a navigation skill configured to output directions, a shopping skill configured to conduct an electronic purchase, and/or the like.

One or more of the components described herein may employ a machine learning (ML) model(s). Generally, ML models may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognition patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

In order to apply machine learning techniques, machine learning processes themselves need to be trained. Training a machine learning model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

As used herein, a "domain" may refer to a collection of related functionality. A domain may be associated with one or more skills performing related functionality may be part of a domain. A non-limiting list of domains includes a smart home domain (corresponding to smart home functionality), a music domain (corresponding to music functionality), a video domain (corresponding to video functionality), a weather domain (corresponding to weather functionality), a communications domain (corresponding to one- or two-way communications functionality), and a shopping domain (corresponding to shopping functionality).

Figure 4:
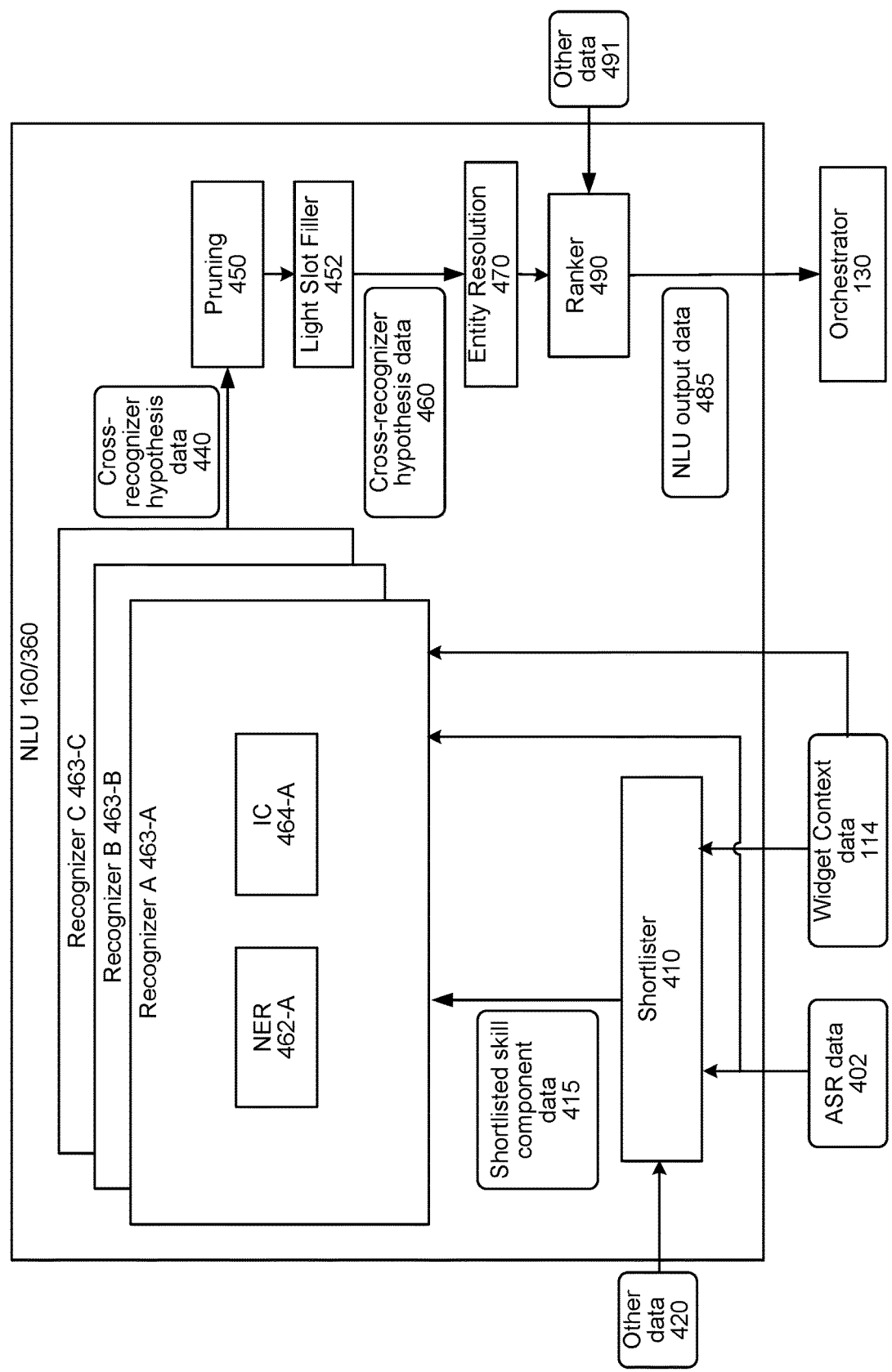
FIG. 4 is a conceptual diagram of how natural language understanding (NLU) processing may be performed, according to embodiments of the present disclosure.

Referring now to FIG. 4, it is described how NLU processing may be performed. The NLU component 160/360 may include one or more recognizers 463. In at least some embodiments, a recognizer 463 may be associated with a skill component 190/390 (e.g., the recognizer may be configured to interpret a natural language input to correspond to the skill component 190/390). In at least some other examples, a recognizer 463 may be associated with a domain (e.g., the recognizer may be configured to interpret a natural language input to correspond to the domain). A non-limiting list of domains includes a smart home domain, a music domain, a video domain, a flash briefing domain, a shopping domain, a communications domain, and/or a custom domain.

Recognizers 463 may process in parallel, in series, partially in parallel, etc. For example, a recognizer corresponding to a first domain may process at least partially in parallel to a recognizer corresponding to a second domain. For further example, a recognizer corresponding to a first skill component may process at least partially in parallel to a recognizer corresponding to a second skill component. In another example, a recognizer corresponding to a domain may process at least partially in parallel to a recognizer corresponding to a skill component.

The NLU component 160/360 may communicate with various storages. The NLU component 160/360 may communicate with an NLU storage, which includes skill component grammars, representing how natural language inputs may be formulated to invoke skill components 190/390, and skill component intents representing intents supported by respective skill components 190/390.

Each recognizer 463 may be associated with a particular grammar, one or more particular intents, and a particular personalized lexicon (stored in an entity library). A gazetteer may include skill component-indexed lexical information associated with a particular user. For example, Gazetteer A may include skill component-indexed lexical information. A user's music skill component lexical information might include album titles, artist names, and song names, for example, whereas a user's contact list skill component lexical information might include the names of contacts. Since every user's music collection and contact list is presumably different, this personalized information may improve entity resolution.

Each recognizer 463 may include a named entity recognition (NER) component 462 that attempts to identify grammars and lexical information that may be used to construe meaning with respect to text data input therein. A NER component 462 identifies portions of text data that correspond to a named entity that may be recognizable by the system 120/device 110. A NER component 462 may also determine whether a word refers to an entity that is not explicitly mentioned in the text, for example "him," "her," "it" or other anaphora, exophora or the like.

A NER component 462 applies grammar models and lexical information associated with one or more skill components 190/390 to determine a mention of one or more entities in text data input therein. In this manner, a NER component 462 identifies "slots" (i.e., particular words in text data) that may be needed for later processing. A NER component 462 may also label each slot with a type (e.g., noun, place, city, artist name, song name, etc.).

Each grammar model may include the names of entities (i.e., nouns) commonly found in natural language about a particular skill component 190/390 to which the grammar model relates, whereas lexical information may be personalized to the user identifier output by a user recognition component 190/390 for the natural language input. For example, a grammar model associated with a shopping skill component may include a database of words commonly used when people discuss shopping.

A downstream process called named entity resolution links a portion of input data (identified by a NER component 462) to a specific entity known to the system 120/device 110. To perform named entity resolution, the NLU component 160/360 may use gazetteer information stored in the entity library storage. The gazetteer information may be used to match text data (identified by a NER component 462) with different entities, such as song titles, contact names, etc. Gazetteers may be linked to users (e.g., a particular gazetteer may be associated with a specific user's music collection), may be linked to certain skill components 190/390 (e.g., a shopping skill component, a music skill component, a video skill component, a communications skill component, etc.), or may be organized in another manner.

Each recognizer 463 may also include an intent classification (IC) component 464 that processes text data input thereto to determine an intent(s) of a skill component(s) 190/390 that potentially corresponds to the natural language input represented in the text data. An intent corresponds to an action to be performed that is responsive to the natural language input represented by the text data. An IC component 464 may communicate with a database of words linked to intents. For example, a music intent database may link words and phrases such as "quiet," "volume off," and "mute" to a <Mute> intent. An IC component 464 identifies potential intents by comparing words and phrases in text data to the words and phrases in an intents database associated with the skill component(s) 190/390 that is associated with the recognizer 463 implementing the IC component 464.

The intents identifiable by a specific IC component 464 may be linked to one or more skill component-specific grammar frameworks with "slots" to be filled. Each slot of a grammar framework corresponds to a portion of text data that a NER component 462 believes corresponds to an entity. For example, a grammar framework corresponding to a <PlayMusic> intent may correspond to text data sentence structures such as "Play {Artist Name}," "Play {Album Name}," "Play {Song name}," "Play {Song name} by {Artist Name}," etc. However, to make resolution more flexible, grammar frameworks may not be structured as sentences, but rather based on associating slots with grammatical tags.

For example, a NER component 462 may identify words in text data as subject, object, verb, preposition, etc. based on grammar rules and/or models prior to recognizing named entities in the text data. An IC component 464 (implemented by the same recognizer 463) may use the identified verb to identify an intent. The NER component 462 may then determine a grammar model associated with the identified intent. For example, a grammar model for an intent corresponding to <PlayMusic> may specify a list of slots applicable to play the identified "object" and any object modifier (e.g., a prepositional phrase), such as {Artist Name}, {Album Name}, {Song name}, etc. The NER component 462 may then search corresponding fields in a lexicon, attempting to match words and phrases in the text data the NER component 462 previously tagged as a grammatical object or object modifier with those identified in the lexicon.

A NER component 462 may perform semantic tagging, which is the labeling of a word or combination of words according to their type/semantic meaning. A NER component 462 may parse text data using heuristic grammar rules, or a model may be constructed using techniques such as hidden Markov models, maximum entropy models, log linear models, conditional random fields (CRF), and the like. For example, a NER component 462, implemented by a music skill component or music domain recognizer 463, may parse and tag text data corresponding to "play mother's little helper by the rolling stones" as {Verb}: "Play," {Object}: "mother's little helper," {Object Preposition}: "by," and {Object Modifier}: "the rolling stones." The NER component 462 may identify "Play" as a verb based on a word database associated with the music skill component or music domain, which an IC component 464 may determine corresponds to a <PlayMusic> intent. At this stage, no determination has been made as to the meaning of "mother's little helper" and "the rolling stones," but based on grammar rules and models, the NER component 462 has determined that the text of these phrases relates to the grammatical object (i.e., entity).

The frameworks linked to the intent are then used to determine what database fields should be searched to determine the meaning of these phrases, such as searching a user's gazetteer for similarity with the framework slots. For example, a framework for a <PlayMusic> intent might indicate to attempt to resolve the identified object based on {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve a slot/field using gazetteer information, the NER component 462 may search a database of generic words (in a knowledge base). For example, if the text data corresponds to "play songs by the rolling stones," after failing to determine an album name or song name called "songs" by "the rolling stones," the NER component 462 may search a music skill component vocabulary for the word "songs." In the alternative, generic words may be checked before the gazetteer information, or both may be tried, potentially producing two different results.

A recognizer 463 may tag text data to attribute meaning thereto. For example, a recognizer 463 may tag "play mother's little helper by the rolling stones" as: {skill component} Music, {intent} Play Music, {artist name} rolling stones, {media type} SONG, and {song title} mother's little helper. For further example, a recognizer 463 may tag "play songs by the rolling stones" as: {skill component} Music, {intent} Play Music, {artist name} rolling stones, and {media type} SONG.

As described above, more than one recognizer 463 may process with respect to ASR data 402 representing a single natural language input. In such instances, each recognizer 463 may output at least one NLU hypothesis including an intent indicator (determined by an IC component 464 of the recognizer 463) and at least one tagged named entity (determined by a NER component 462 of the recognizer 463).

In some embodiments, the recognizer 463, including the NER component 462 and the IC component 464, may process with respect to the widget context data 114. The IC component 464 may use the information included in the widget context data 114 to determine intent data corresponding to a user input. The NER component 462 may use the information included in the widget context data 114 to determine entity data.

The NLU component 160/360 may include a shortlister component 410. The shortlister component 410 selects skill components 190/390 that may execute in response to the natural language input. The shortlister component 410 thus limits downstream, more resource intensive NLU processes to being performed with respect to skill components 190/390 that are likely to execute in response to the natural language input.

Without a shortlister component 410, the NLU component 160/360 may process a given ASR hypothesis, included in the ASR data 402, (or the text data depending on the type of natural language input being processed) with respect to every skill component 190/390 of (or in communication with) the system 120, either in parallel, in series, or using some combination thereof. By implementing a shortlister component 410, the NLU component 160/360 may process a given ASR hypothesis included in the ASR data 402 with respect to only the skill components 190/390 that are likely to execute in response to the natural language input. This reduces total compute power and latency attributed to NLU processing.

The shortlister component 410 may include one or more machine learning (ML) models. The ML model(s) may be trained to recognize various forms of natural language inputs that may be received by the system 120/device 110. For example, during a training period a skill component 190/390 may provide the system 120/device 110 with training data representing sample natural language inputs that may be provided by a user to invoke the skill component 190/390. For example, a ride sharing skill component may provide the system 120/device 110 with training data including text corresponding to "get me a cab to [location]," "get me a ride to [location]," "book me a cab to [location]," "book me a ride to [location]," etc. The one or more ML models may be trained using the training data to determine other potentially related natural language input structures that a user may try to use to invoke the particular skill component 190/390. During training, the system 120/device 110 may query the skill component 190/390 regarding whether the determined other natural language input structures are permissible, from the perspective of the skill component 190/390, to be used to invoke the skill component 190/390 at runtime. The alternate natural language input structures may be derived by one or more ML models during model training and/or may be based on natural language input structures provided by different skill components 190/390. The skill component 190/390 may also provide the system 120/device 110 with training data indicating grammar and annotations. The system 120/device 110 may use the training data representing the sample natural language inputs, the determined related natural language input(s), the grammar, and the annotations to train a ML model that indicates when a runtime natural language input is likely to be directed to/handled by a particular skill component 190/390. Each ML model of the shortlister component 410 may be trained with respect to a different skill component 190/390. Alternatively, the shortlister component 410 may implement one ML model per skill component type, such as one ML model for weather skill components, one ML model for ride sharing skill components, etc.

The system 120/device 110 may use the sample natural language inputs provided by a skill component 190/390, and related sample natural language inputs determined during training, as binary examples to train a ML model associated with the skill component 190/390. The ML model associated with the particular skill component 190/390 may then be operated at runtime by the shortlister component 410. Some sample natural language inputs may be positive training examples (e.g., natural language inputs that may be used to invoke the skill component 190/390), whereas other sample natural language inputs may be negative training examples (e.g., natural language inputs that may not be used to invoke the skill component 190/390).

As described above, the shortlister component 410 may include a different ML model for each skill component 190/390, a different ML model for each skill component type, or some other combination of ML models. For example, the shortlister component 410 may alternatively include a single ML model. The single ML model may include a portion trained with respect to characteristics (e.g., semantic characteristics) shared by all skill components 190/390. The single ML model may also include skill component-specific portions, with each skill component-specific portion being trained with respect to a different skill component 190/390. Implementing a single ML model with skill component-specific portions may result in less latency than implementing a different ML model for each skill component 190/390 because the single ML model with skill component-specific portions limits the number of characteristics processed on a per skill component level.

The portion of the ML model, trained with respect to characteristics shared by more than one skill component 190/390, may be clustered based on skill component type. For example, a first portion, of the portion trained with respect to multiple skill components 190/390, may be trained with respect to weather skill components; a second portion, of the portion trained with respect to multiple skill components 190/390, may be trained with respect to music skill components; a third portion, of the portion trained with respect to multiple skill components 190/390, may be trained with respect to travel skill components; etc.

Clustering may not be beneficial in every instance because clustering may cause the shortlister component 410 to output indications of only a portion of the skill components 190/390 that the natural language input may relate to. For example, a natural language input may correspond to "tell me about Tom Collins." If the ML model is clustered based on skill component type, the shortlister component 410 may determine the natural language input corresponds to a recipe skill component (e.g., storing or otherwise having access to a drink recipe) even though the natural language input may also correspond to an information skill component (e.g., storing or otherwise having access to information about a person named Tom Collins).

Training the ML model(s) of the shortlister component 410 may require establishing a "ground truth" for the training examples input therein. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques.

The ML model(s) of the shortlister component 410 may be trained and operated according to various machine learning techniques. Such techniques may include, for example, neural networks (such as deep neural networks and/or recurrent neural networks), inference engines, trained classifiers, etc. Examples of trained classifiers include Support Vector Machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so that the examples of the separate categories are divided by clear gaps. New examples are then mapped into that same space and predicted to belong to a category based on which side of the gaps they fall on. Classifiers may issue a "score" indicating which category the data most closely matches. The score may provide an indication of how closely the data matches the category.

If the shortlister component 410 determines a natural language input is associated with multiple skill components 190/390, only the recognizers 463 associated with those skill components 190/390 may process with respect to the natural language input. The selected recognizers 463 may process in parallel, in series, partially in parallel, etc. For example, if the shortlister component 410 determines a natural language input may relate to both a communications skill component and a music skill component, a recognizer 463 associated with the communications skill component may process in parallel, or partially in parallel, with a recognizer 463 associated with the music skill component processing.

The shortlister component 410 may make binary determinations (e.g., yes or no) regarding which skill component(s) 190/390 corresponds to a natural language input. The shortlister component 410 may make such determinations using the one or more ML models described herein above. If the shortlister component 410 implements a single ML model for each skill component 190/390, the shortlister component 410 may simply run the ML models that are associated with enabled skill components 190/390 as indicated in a profile (e.g., stored in the profile storage 170/370) associated with the device 110 and/or user 105 that originated the natural language input.

In some embodiments, the shortlister component 410 may use the widget context data 114 to determine the skill components 190/390 that correspond to the user input. The shortlister component 410 may process the widget context data 114 using one or more of the ML models described above.

The shortlister component 410 may generate shortlisted skill component data 415 representing one or more skill components 190/390 that may execute in response to the user input. The skill components 190/390 included in the shortlisted skill component data 415 may be based on the widget context data 114. The number of skill components 190/390 represented in the shortlisted skill component data 415 is configurable. In an example, the shortlisted skill component data 415 may indicate every skill component 190/390 of (or otherwise in communication with) the system 120/device 110 as well as contain an indication, for each skill component 190/390, representing whether the skill component 190/390 is likely capable of processing in response to the natural language input. In another example, instead of indicating every skill component 190/390, the shortlisted skill component data 415 may only indicate the skill components 190/390 that are likely capable of processing in response to the natural language input. In yet another example, the shortlister component 410 may implement thresholding such that the shortlisted skill component data 415 may indicate no more than a maximum number of skill components 190/390 that may process in response to the natural language input.

In at least some embodiments, the shortlister component 410 may generate a score representing how likely a skill component 190/390 is likely to process in response to a user input. In such embodiments, the shortlisted skill component data 415 may only include identifiers of skill components 190/390 associated with scores meeting or exceeding a threshold score.

In the situation where the ASR component 150/350 outputs ASR data 402 including more than one interpretation of a spoken input, the shortlister component 410 may output different shortlisted skill component data 415 for each interpretation. Alternatively, the shortlister component 410 may output a single shortlisted skill component data 415 representing the skill components 190/390 corresponding to the different interpretations.

As indicated above, the shortlister component 410 may implement thresholding such that the shortlisted skill component data 415 may indicate no more than a threshold number of skill components 190/390 (e.g., may include no more than a threshold number of skill component identifiers). If the ASR component 150/350 outputs ASR data 402 including more than one interpretation of a natural language input, the shortlisted skill component data 415 may indicate no more than a threshold number of skill components 190/390 irrespective of the number of interpretations output by the ASR component 150/350. Alternatively or in addition, the shortlisted skill component data 415 may indicate no more than a threshold number of skill components 190/390 for each interpretation (e.g., indicating no more than five skill components 190/390 for a first interpretation, no more than five skill components 190/390 for a second interpretation, etc.).

In addition to making a binary determination regarding whether a skill component 190/390 may process in response to a natural language input, the shortlister component 410 may generate scores representing likelihoods that skill components 190/390 may process in response to the natural language input. If the shortlister component 410 implements a different ML model for each skill component 190/390, the shortlister component 410 may generate a different confidence score for each skill component-specific ML model that is run by the shortlister component 410. For example, if the shortlister component 410 runs the ML models of every skill component 190/390 of (or otherwise in communication with) the system 120/device 110, the shortlister component 410 may generate a respective confidence score for each skill component 190/390. For further example, if the shortlister component 410 only runs ML models specific to skill components 190/390 that are indicated as enabled in a profile associated with the device 110 and/or user 105 (as stored in the profile storage 170/370), the shortlister component 410 may only generate a respective confidence score for each enabled skill component 190/390. For further example, if the shortlister component 410 implements a single ML model with skill component-specific portions, the shortlister component 410 generate a respective confidence score for each skill component 190/390 who's specifically trained portion is run. The shortlister component 410 may perform matrix vector modification to obtain confidence scores for skill components 190/390.

An example of shortlisted skill component data 415 including confidence scores may be represented as:

Search skill component, 0.67
Recipe skill component, 0.62
Information skill component, 0.57

As indicated, the confidence scores output by the shortlister component 410 may be numeric values. The confidence scores output by the shortlister component 410 may alternatively be binned values (e.g., high, medium, low).

The shortlister component 410 may consider other data 420 when determining which skill components 190/390 may process in response to a natural language input. The other data 420 may be character embedded prior to being input to the shortlister component 410. The other data 420 may alternatively be embedded using other techniques.

The other data 420 may include usage history data associated with the device 110 and/or user 105. For example, a confidence score of a skill component 190/390 may be increased if natural language inputs captured by the device 110 and/or originating from the user 105 routinely relate to the skill component 190/390. Conversely, a confidence score of a skill component 190/390 may be decreased if natural language inputs captured by the device 110 and/or originated from the user 105 rarely relate to the skill component 190/390.

The other data 420 may indicate the skill components 190/390 that are enabled with respect to the device 110 and/or user 105 (e.g., as represented in the profile storage 170/370). The shortlister component 410 may use such data to determine which skill component-specific ML models to run. That is, the shortlister component 410 may determine to only run the ML models associated with enabled skill components 190/390. The shortlister component 410 may alternatively use such data to alter skill component confidence scores represented in the shortlisted skill component data 415. As an example, considering two skill components 190/390, one enabled and another unenabled, the shortlister component 410 may run a first ML model (or ML model portion) specific to the unenabled skill component as well as a second ML model (or ML model portion) specific to the enabled skill component. The shortlister component 410 may initially determine a confidence score of 0.60 for each of the unenabled skill component and the enabled skill component. The shortlister component 410 may then alter those confidence scores based on which skill component is enabled. For example, the shortlister component 410 may increase the confidence score associated with the enabled skill component and/or decrease the confidence score associated with the unenabled skill component.

A user 105 may provide the system 120 with indications of which skill components 190/390 are enabled (e.g., authorized to execute using data associated with the user 105). Such indications may be stored in the profile storage 170/370. The shortlister component 410 may determine whether profile data associated with the user 105 and/or device 110 that originated the natural language input includes indications of enabled skill components 190/390.

The other data 420 may indicate a type of the device 110. The type of the device 110 may indicate the input/output capabilities of the device 110. For example, the device 110 may include a display, may be headless (e.g., displayless), may be mobile or stationary, may include audio playback capabilities, may include a camera, etc. The shortlister component 410 may use such other data 420 to determine which skill component-specific ML models (or ML model portions) to run. For example, if the device 110 is displayless, the shortlister component 410 may determine not to run ML models (or ML model portions) specific to skill components 190/390 that output video data. The shortlister component 410 may alternatively use such other data 420 to alter skill component confidence scores represented in the shortlisted skill component data 415. As an example, considering two skill components 190/390, one that outputs audio data and another that outputs video data, the shortlister component 410 may run a first ML model (or portion of a ML model) specific to the skill component that generates audio data as well as a second ML model (or portion of a ML model) specific to the skill component that generates video data. The shortlister component 410 may initially determine a confidence score of 0.60 for each of the skill components. The shortlister component 410 may then alter the original confidence scores based on the type of the device 110. For example, if the device 110 is displayless, the shortlister component 410 may increase the confidence score associated with the skill component that generates audio data and/or decrease the confidence score associated with the skill component that generates video data.

The type of device data represented in the other data 420 may represent output capabilities of the device 110 to be used to output content to the user 105, which may not necessarily be the device 110 that captured the natural language input. For example, a displayless device 110 may receive a natural language input corresponding to "play Game of Thrones". The system 120/device 110 may determine a smart TV, or other device including or otherwise associated with a display, is to be used to output multimedia content (e.g., audio and video) corresponding to the title "Game of Thrones".

The other data 420 may include data indicating a speed of the device 110, a location of the device 110, or other mobility data. For example, the device 110 may correspond to a vehicle including a display. If the vehicle is moving, the shortlister component 410 may decrease the confidence score associated with a skill component 190/390 that generates video data as it may be undesirable to output video content to the user 105 while in a moving vehicle. The vehicle may output data to the system 120 indicating when the vehicle is in motion.

The other data 420 may include data indicating a currently invoked skill component 190/390 (e.g., a skill component 190/390 that was processing to output content to the user 105 when the device 110 received the natural language input). For example, the user 105 may speak a first (e.g., a previous) natural language input causing the system 120 to invoke a music skill component to output music to the user 105. As the music is being output to the user 105, the system 120 may receive a second (e.g., a current) natural language input. The shortlister component 410 may use such other data 420 to alter skill component confidence scores represented in the shortlisted skill component data 415. For example, the shortlister component 410 may run a first ML model (or ML model portion) specific to a first skill component as well as a second ML model (or ML model portion) specific to a second skill component. The shortlister component 410 may initially determine a confidence score of 0.60 for each of the first and second skill components. The shortlister component 410 may then alter the original confidence scores based on the first skill component being invoked to output content while the current natural language input was received. Based on the first skill component being invoked, the shortlister component 410 may increase the confidence score associated with the first skill component and/or decrease the confidence score associated with the second skill component.

The thresholding implemented with respect to the shortlisted skill component data 415 and the different types of other data 420 considered by the shortlister component 410 are configurable. For example, the shortlister component 410 may update confidence scores as more other data 420 is considered.

The shortlister component 410 may cause the NLU component 160/360 to invoke only a subset of the recognizers 463 associated with skill components 190/390 represented in the shortlisted skill component 415 as being likely to process in response to the natural language input. If the shortlister component 410 generates the shortlisted skill component data 415 to include confidence scores, the shortlister component 410 may cause the NLU component 160/360 to invoke only recognizers 463 associated with skill components 190/390 associated with confidence scores satisfying (e.g., meeting or exceeding) a condition (e.g., a threshold confidence score).

The NLU component 160/360 may compile NLU hypotheses, output by multiple recognizers 463, into cross-recognizer hypothesis data 440 (illustrated in FIG. 4). Each NLU hypothesis may be associated with a respective score indicating a likelihood that the NLU hypothesis corresponds to the domain, one or more skill components 190/390, etc. associated with the recognizer 463 from which the NLU hypothesis was output. For example, the cross-recognizer hypothesis data 440 may be represented as, with each line corresponding to a different NLU hypothesis:

[0.95] Intent: <PlayMusic> AlbumName: GameOfThrones

[0.70] Intent: <PlayVideo> VideoTitle: GameOfThrones.

While the foregoing illustrates cross-recognizer hypothesis data 440 include two NLU hypotheses, it will be appreciated that the cross-recognizer hypothesis data 440 may include differing numbers of NLU hypotheses with departing from the present disclosure.

The NLU component 160/360 may send the cross-recognizer hypothesis data 440 to a pruning component 450, which sorts the NLU hypotheses, represented in the cross-recognizer hypothesis data 440, according to their respective scores. The pruning component 450 may then perform score thresholding with respect to the cross-recognizer hypothesis data 440. For example, the pruning component 450 may select NLU hypotheses, represented in the cross-recognizer hypothesis data 440, associated with scores satisfying (e.g., meeting and/or exceeding) a condition (e.g., a threshold score). The pruning component 450 may additionally or alternatively perform number of NLU hypothesis thresholding. For example, the pruning component 450 may select a threshold number of top-scoring NLU hypotheses represented in the cross-recognizer hypothesis data 440.

The pruning component 450 may generate cross-recognizer hypothesis data 460 including the selected NLU hypotheses. The purpose of the pruning component 450 is to create a reduced list of NLU hypotheses so that downstream, more resource intensive, processes may only operate on NLU hypotheses that most likely represent the natural language input.

The NLU component 160/360 may include a light slot filler component 452 that takes text from slots, represented in the NLU hypotheses output by the pruning component 450, and alters it to make the text more easily processed by downstream components. The light slot filler component 452 may perform low latency operations that do not involve heavy operations such as reference to a knowledge base. The purpose of the light slot filler component 452 is to replace words with other words or values that may be more easily understood by downstream components. For example, if a NLU hypothesis includes the word "tomorrow," the light slot filler component 452 may replace the word "tomorrow" with an actual date for purposes of downstream processing. Similarly, the light slot filler component 452 may replace the word "CD" with "album" or "compact disc." The replaced text is then included in the cross-recognizer hypothesis data 460.

The cross-recognizer hypothesis data 460 may be sent to an entity resolution component 470. The entity resolution component 470 can apply rules or other instructions to standardize labels or tokens in the NLU hypotheses represented in the cross-recognizer hypothesis data 460. The precise transformation may depend on the skill component 190/390, domain, etc. to which a NLU hypothesis relates. For example, for a travel skill component-specific NLU hypothesis, the entity resolution component 470 may transform text corresponding to "Boston airport" to the standard "BOS" three-letter code referring to the airport. The entity resolution component 470 can refer to a knowledge base that is used to specifically identify the precise entity referred to in each slot of each NLU hypothesis represented in the cross-recognizer hypothesis data 460.

Specific intent/slot combinations may also be tied to a particular source, which may then be used to resolve the text. Referring to the example natural language input "play songs by the stones," the entity resolution component 470 may reference a personal music catalog, a user profile, or the like (for example stored in the profile storage 170/370). The entity resolution component 470 may output NLU hypotheses, altered from the cross-recognizer hypothesis data 460, that include more detailed information (e.g., entity identifiers) about the specific entities mentioned in the slots and/or more detailed slot data that can eventually be used by a skill component 190/390 to perform an action responsive to the natural language input. The NLU component 160/360 may include multiple entity resolution components 470 that are each specific to one or more different skill components 190/390, domains, etc.

In some embodiments, the entity resolution component 470 may use the widget context data 114 to determine the specific entity corresponding to a slot/entity represented in the user input.

The NLU component 160/360 may include a ranker component 490 that assigns a particular score to each NLU hypothesis output by the entity resolution component 470. The ranker component 490 may alter the score of a particular NLU hypothesis based on whether the NLU hypothesis has unfilled slots. For example, if a first NLU hypothesis includes slots that are all filled/resolved, the ranker component 490 may assign the first NLU hypothesis a higher score than a second NLU hypothesis including at least one slot that is unfilled/unresolved by the entity resolution component 470.

The ranker component 490 may apply re-scoring, biasing, or other techniques. To do so, the ranker component 490 may consider not only the data output by the entity resolution component 470, but may also other data 491. The other data 491 may include a variety of data.

For example, the other data 491 indicate skill component 190/390 rating or popularity. For example, if a skill component 190/390 has a high rating, the ranker component 490 may increase the score of a NLU hypothesis associated with that skill component 190/390, and vice versa.

The other data 491 may indicate skill components 190/390 that have been enabled by the user 105. For example, the ranker component 490 may assign higher scores to NLU hypotheses associated with enabled skill components than NLU hypotheses associated with skill components that have not been enabled by the user 105.

The other data 491 include system usage history (e.g., specific to the user 105), such as if the user 105 regularly invokes a particular skill component 190/390 or does so at particular times of day. The other data 491 may indicate a present date, a present time, location of the device 110, weather data, a type of the device 110, a user identifier of the user 105, context data, as well as other data. For example, the ranker component 490 may consider when any particular skill component 190/390 is currently active with respect to the present user 105 and/or device 110 (e.g., music being output by the skill component 190/390 when the current natural language input is received).

The ranker component 490 may output NLU output data 485 including one or more NLU hypotheses. The NLU component 160/360 may send the NLU output data 485 to the orchestrator component 130.

Figure 5:
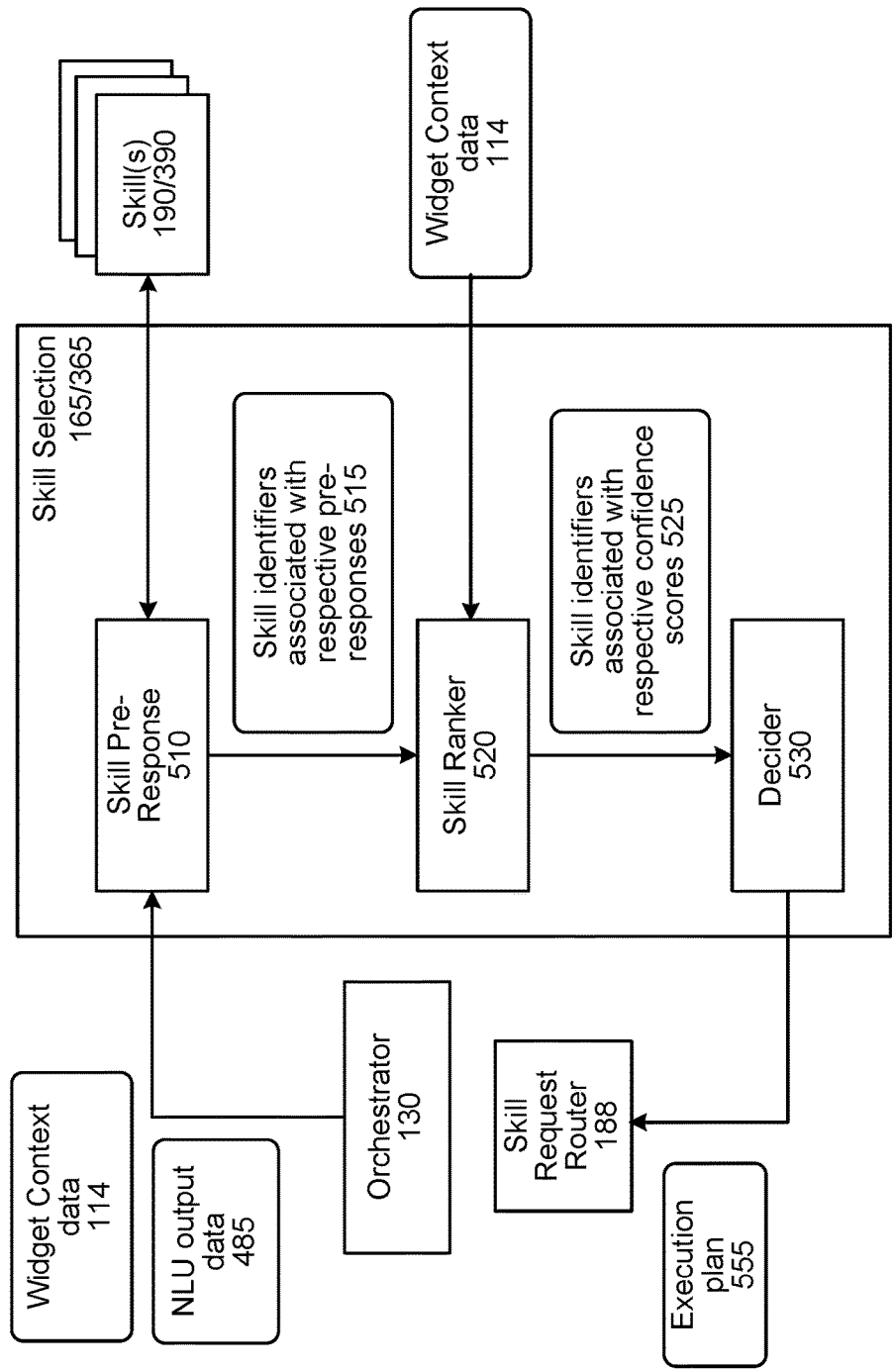
FIG. 5 is a conceptual diagram illustrating a skill selection component configured to select a skill for responding to a user input, according to embodiments of the present disclosure.

Referring to FIG. 5, details of how the skill selection component 165/365 may be configured are described. When the skill selection component 165/365 receives NLU output data 485 from the NLU component 160, the NLU output data 485 may be sent to a skill pre-response component 510. The skill pre-response component 510 is configured to query skills, associated with the NLU output data 485 as to whether the skills are able to process the NLU hypothesis with which they are associated. In some embodiments, the skill pre-response component 510 may query skills associated with the multi-modal widgets 112 as to whether the skills are able to process an NLU hypothesis.

The skill pre-response component 510 sends a pre-response query to each skill component 190/390 associated with a NLU hypothesis represented in the NLU output data 485. A pre-response query may include a NLU hypothesis (associated with the skill component 190/390 receiving the pre-response query), portion of the widget context data 114 that corresponds to the queried skill, and optionally other context data corresponding to the user input.

A skill component 190/390 may determine, based on a received pre-response query (and optionally other data available to the skill component 190/390), whether the skill 190/390 could respond to the natural language input. For example, a skill component 190/390 may generate a pre-response indicating the skill component 190/390 can respond to the natural language input, indicating the skill component 190/390 may be able to respond to the natural language input (e.g., the indicating the skill component 190/390 needs more data to determine whether the skill component 190/390 can respond to the natural language input), or indicating the skill component 190/390 cannot respond to the natural language input (e.g., due to present processing load).

In situations where a skill's pre-response indicates the skill component 190/390 can or may be able to respond to the natural language input, the pre-response may also include various other data representing a strength of the skill's potential response to the natural language input. Such other data may positively influence the skill's ranking as described herein below. For example, such other data may indicate capabilities (e.g., output capabilities or components such as a connected screen, loudspeaker, etc.) of a device to be used to output the skill's response; pricing data corresponding to a product or service the natural language input is requesting be purchased (or is requesting purchase data for); availability of a product the natural language input is requesting be purchased; whether there are shipping fees for a product the natural language input is requesting be purchased; whether the user 105 already has a profile and/or subscription with the skill component 190/390; that the user 105 does not have a subscription with the skill component 190/390, but that there is a free trial/tier the skill component 190/390 is offering; with respect to a taxi skill, a cost of a trip based on start and end locations, how long the user 105 would have to wait to be picked up, etc.; and/or other data available to the skill component 190/390 that is related to the skill's processing of the natural language input. In at least some embodiments, a skill's pre-response may include an indicator (e.g., a flag) representing a strength of the skill's ability to personalize its response to the user 105.

In at least some embodiments, a skill's pre-response may be configured to a schema pre-defined by the system 120. By the system 120 requiring pre-responses to conform to a specific schema (e.g., by requiring skill components 190/390 to only be able to provide certain types of data in pre-responses), the system 120 may onboard new skill components 190/390 into the skill selection functionality described herein without needing to reconfigure the skill selection component 165/365 each time a new skill component 190/390 is onboarded. Moreover, requiring pre-responses to conform to a schema limits the amount of values needed to be used to train and implement a machine learning model for ranking skill components 190/390, as described herein below.

The skill pre-response component 510 may receive pre-response data from the queried skills, and output data 515 including the skill identifiers associated with respective pre-responses. As indicated above, a skill's pre-response data may indicate the skill component 190/390 would be unable to process if called to execute with respect to the natural language input. In at least some embodiments, the skill pre-response component 510 may only include, in the data 515, the skill identifiers associated with pre-response data that does not indicate an associated skill component 190/390 would be unable to process. The data 515, output by the skill pre-response component 510, may not include any confidence scores representing associated skill component 190/390 should be used to respond to the natural language input.

The data 515, output by the skill pre-response component 510, may be input to a skill ranker 520 of the skill selection component 165/365. The skill ranker 520 may be configured to rank skill components 190/390 using a machine learning model. In at least some embodiments, the machine learning model may be a deep neural network (DNN).

The skill ranker 520 also receives context data corresponding to the natural language input. Such context data may indicate, for example, one or more preferences (e.g., skill 125 preferences) of the user 105 (as represented in a user profile or group profile stored in the profile storage 170), one or more domains corresponding to the natural language input, one or more intents representing the natural language input, NER entity values as represented in the NLU output data, a measure of success of entity resolution performed with respect to the natural language input, text representing the natural language input, rankings of individual NLU hypotheses within the NLU output data, a device type of the device 110 that received the natural language input, whether the device 110 was outputting audio when the natural language input was received, whether the device 110 was outputting video when the natural language input was received, and/or other context data available to the skill ranker 520. The skill ranker 520 may also receive the widget context data 114.

Using the ML model, the skill ranker 520 ranks the skill component 190/390 based on the data 515, the widget context data 114, and the context data. Things that may increase a skill's ranking include, for example, that the skill component 190/390 is associated with pre-response data indicating the skill component 190/390 can generate a response (to the natural language input) that is personalized to the user 105, that a NLU hypothesis corresponding to the skill component 190/390 is associated with a NLU confidence score satisfying (e.g., meeting or exceeding) a condition (e.g., a threshold NLU confidence score), that the skill component 190/390 corresponds to a music skill and the device 110 was outputting music when the natural language input was received, that the skill component 190/390 corresponds to a video skill and the device 110 was outputting video when the natural language input was received, etc. Things that may decrease a skill's ranking include, for example, that the skill component 190/390 is associated with pre-response data indicating the skill component 190/390 cannot generate a response (to the natural language input) that is personalized to the user 105, that a NLU hypothesis corresponding to the skill component 190/390 is associated with a NLU confidence score failing to satisfy (e.g., falling below) a condition (e.g., a threshold NLU confidence score), that the skill component 190/390 corresponds to a video skill and the device 110 was outputting music when the natural language input was received, that the skill component 190/390 corresponds to a music skill and the device 110 was outputting video when the natural language input was received, etc. Other example are possible and will depend on the context data available to the skill ranker 520.

The skill ranker 520 outputs data 525 including the skill identifiers associated with respective confidence scores, where a confidence score represents a strength with which the skill ranker 520 recommends the associated skill component 190/390 is to execute to respond to the natural language input. Such a confidence score may be a numeric score (e.g., between 0 and 1) or a binned score (e.g., low, medium, high). The data 525 may also include one or more widget identifiers (and/or widget instance identifiers) corresponding to the multi-modal widgets 112, when the skill component 190/390 included in the data 525 corresponds to the multi-modal widgets 112 active or enabled at the device 110. As such, the data 525 may include skill identifiers associated with one or more skill components 190/390 that has a multi-modal widget active or enabled at the device 110, and/or may include skill identifiers associated with one or more skill components 190/390 that do not have a multi-modal widget active or enabled at the device 110.

A decider component 530 may receive the data 525 output by the skill ranker 520. The decider component 530 may be configured to generate an execution plan 555 based on the data 525 (representing the skill identifiers associated with respective confidence scores) and context data (e.g., representing NLU hypotheses associated with the skill component identifiers and the widget context data 114).

In some embodiments, the decider component 530 may select the skill component 190/390 associated with the highest confidence score in the data 525. In some embodiments, the decider component 530 may select the skill component 190/390 associated with a confidence score that satisfies a condition (e.g., exceeds a threshold value). In some embodiments, the decider component 530 may select the skill component 190/390 associated with a confidence score that satisfies a threshold condition and satisfies a condition corresponding to context data, such as the widget context data 114.

The decider component 530 may generate an execution plan 555 including the skill identifier, of the skill component 190/390 selected by the decider component 530 to execute in response to the natural language input, the NLU hypothesis associated with the skill identifier, a portion of the widget context data 114 corresponding to the selected skill component 190/390 (i.e. the widget context data 116) and a command to execute/invoke the skill component 190/390 corresponding to the skill identifier. The decider component 530 may send the execution plan 555 to the skill request router component 188, which may cause the skill component 190/390 (corresponding to the skill identifier in the execution plan 555) to process the NLU hypothesis to determine output data responsive to the natural language input.

Figure 6:
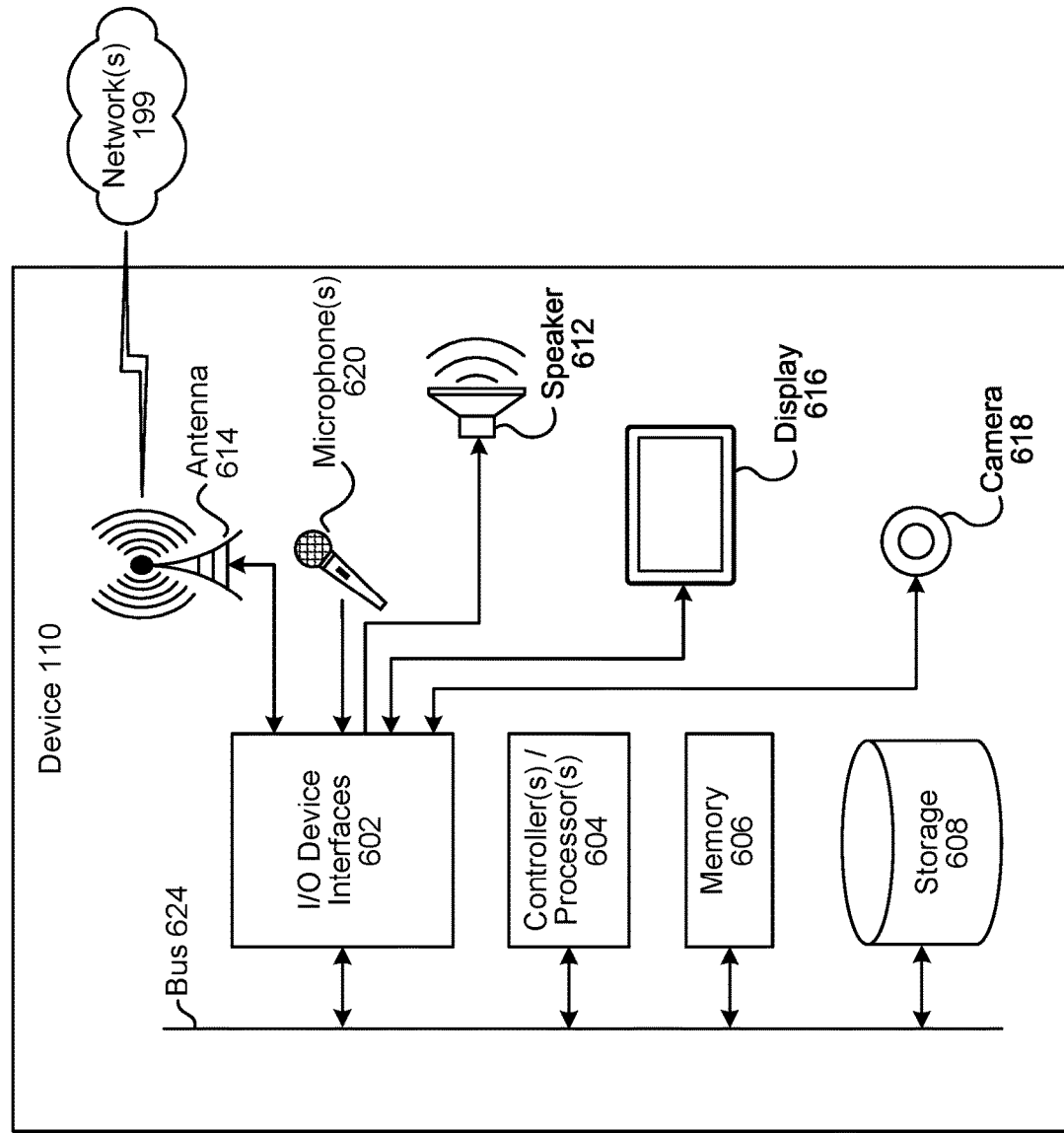
FIG. 6 is a block diagram conceptually illustrating example components of a device, according to embodiments of the present disclosure.
Figure 7:
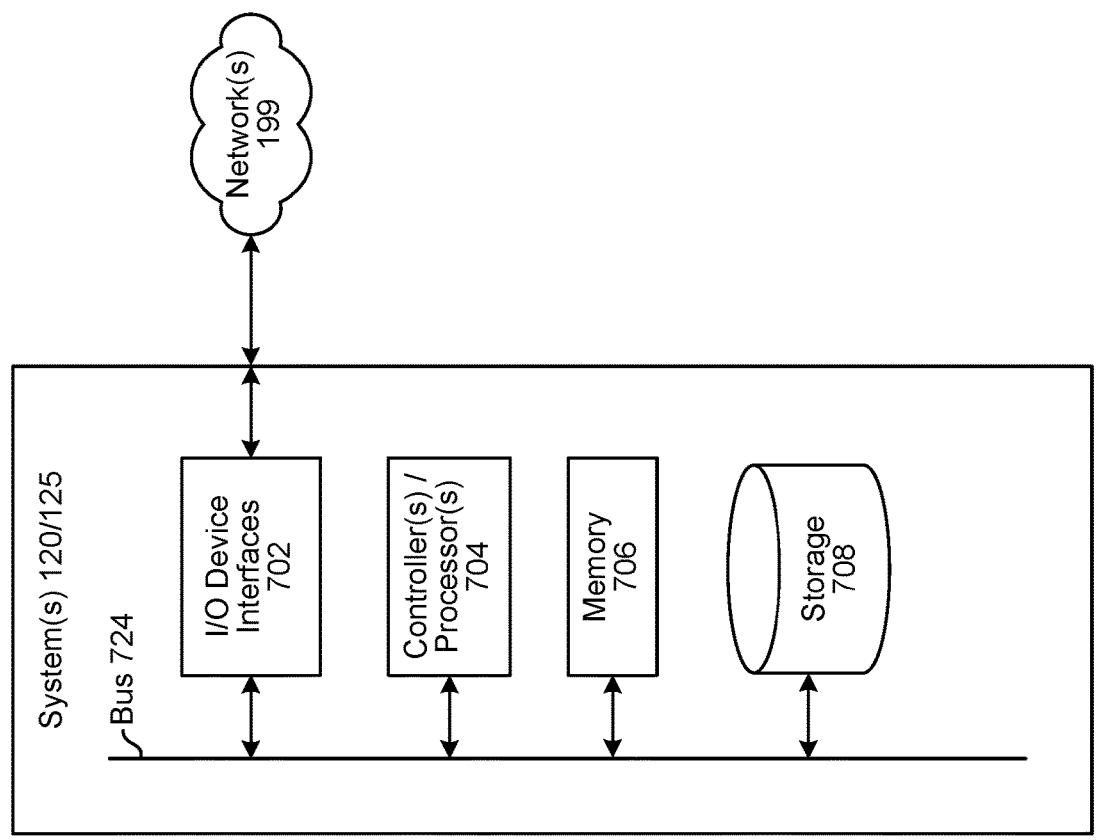
FIG. 7 is a block diagram conceptually illustrating example components of a system, according to embodiments of the present disclosure.

FIG. 6 is a block diagram conceptually illustrating a device 110 of the system 100. FIG. 7 is a block diagram conceptually illustrating example components of a remote device, such as the system 120 and the skill(s) system 125. A system (120/125) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system (120/125) may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/125) may be included in the system 100 of the present disclosure, such as, one or more systems 120 and/or one or more skills 125. In operation, each of these systems may include computer-readable and computer-executable instructions that reside on the respective device (120/125), as will be discussed further below.

Each of these devices (110/120/125) may include one or more controllers/processors (604/704), which may each include a central processing unit (CPU) for processing data and computer-readable instructions, and a memory (606/706) for storing data and instructions of the respective device. The memories (606/706) may individually include volatile random access memory (RAM), non-volatile read only memory (ROM), non-volatile magnetoresistive memory (MRAM), and/or other types of memory. Each device (110/120/125) may also include a data storage component (608/708) for storing data and controller/processor-executable instructions. Each data storage component (608/708) may individually include one or more non-volatile storage types such as magnetic storage, optical storage, solid-state storage, etc. Each device (110/120/125) may also be connected to removable or external non-volatile memory and/or storage (such as a removable memory card, memory key drive, networked storage, etc.) through respective input/output device interfaces (602/702).

Computer instructions for operating each device (110/120/125) and its various components may be executed by the respective device's controller(s)/processor(s) (604/704), using the memory (606/706) as temporary "working" storage at runtime. A device's computer instructions may be stored in a non-transitory manner in non-volatile memory (606/706), storage (608/708), or an external device(s). Alternatively, some or all of the executable instructions may be embedded in hardware or firmware on the respective device in addition to or instead of software.

Each device (110/120/125) includes input/output device interfaces (602/702). A variety of components may be connected through the input/output device interfaces (602/702), as will be discussed further below. Additionally, each device (110/120/125) may include an address/data bus (624/724) for conveying data among components of the respective device. Each component within a device (110/120/125) may also be directly connected to other components in addition to (or instead of) being connected to other components across the bus (624/724).

Referring to FIG. 6, the device 110 may include input/output device interfaces 602 that connect to a variety of components such as an audio output component such as a speaker 612, a wired headset or a wireless headset (not illustrated), or other component capable of outputting audio. The device 110 may also include an audio capture component. The audio capture component may be, for example, a microphone 620 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 616 for displaying content. The device 110 may further include a camera 618.

Via antenna(s) 614, the input/output device interfaces 602 may connect to one or more networks 199 via a wireless local area network (WLAN) (such as Wi-Fi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (602/702) may also include communication components that allow data to be exchanged between devices such as different physical servers in a collection of servers or other components.

The components of the device 110, the system 120, and/or skill 125 may include their own dedicated processors, memory, and/or storage. Alternatively, one or more of the components of the device 110, the system 120, and/or skill 125 may utilize the I/O interfaces (602/702), processor(s) (604/704), memory (606/706), and/or storage (608/708) of the device 110, the system 120, and/or skill 125, respectively.

As noted above, multiple devices may be employed in a single system. In such a multi-device system, each of the devices may include different components for performing different aspects of the system's processing. The multiple devices may include overlapping components. The components of the device 110, the system 120, and the skill 125, as described herein, are illustrative, and may be located as a stand-alone device or may be included, in whole or in part, as a component of a larger device or system.

Figure 8:
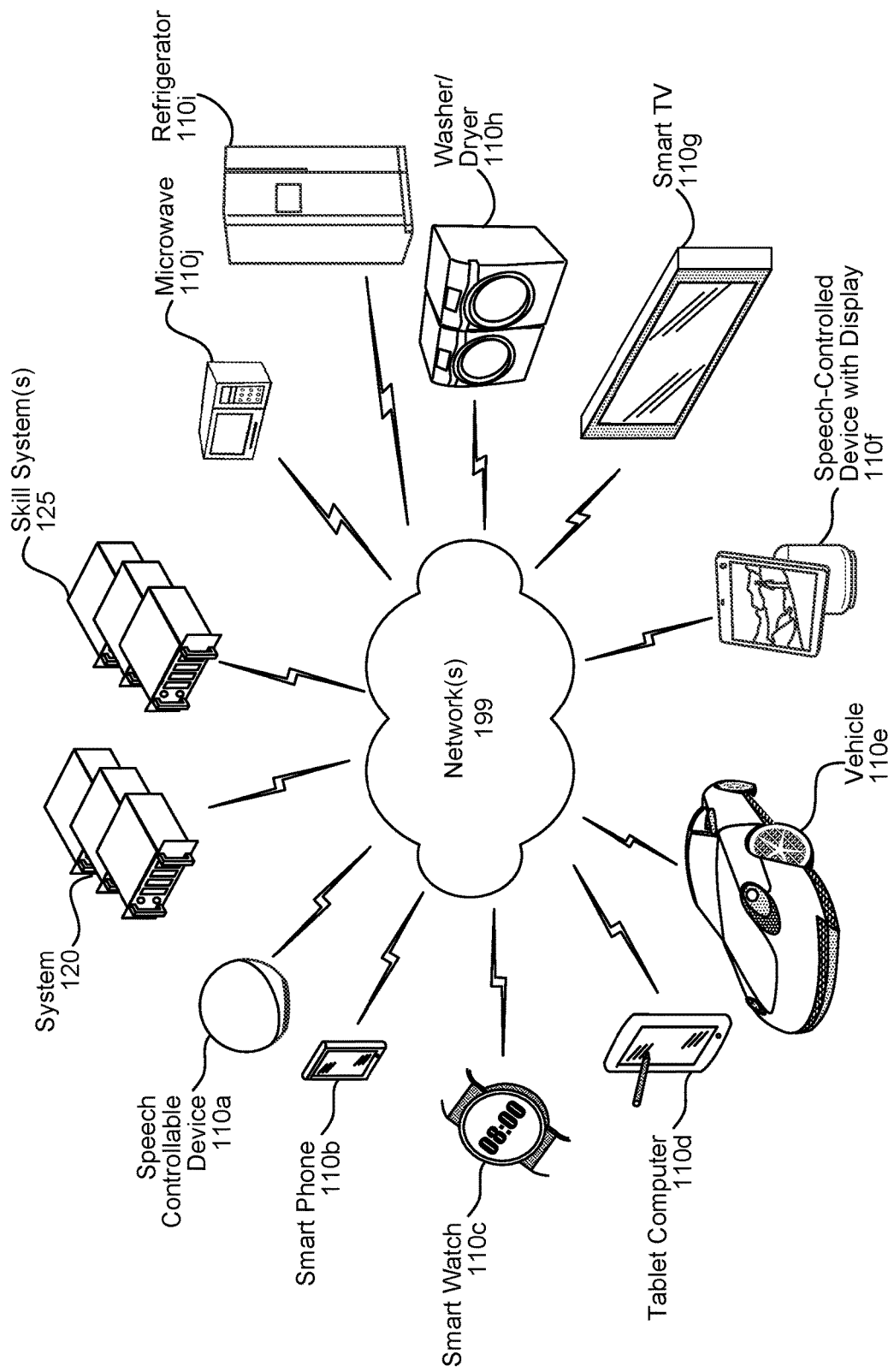
FIG. 8 illustrates an example of a computer network for use with the overall system, according to embodiments of the present disclosure.

As illustrated in FIG. 8, multiple devices (110*a*-110*j*, 120, 125) may contain components of the system and the devices may be connected over a network(s) 199. The network(s) 199 may include a local or private network or may include a wide network such as the Internet. Devices may be connected to the network(s) 199 through either wired or wireless connections. For example, a speech-controllable device 110*a*, a smart phone 110*b*, a smart watch 110*c*, a tablet computer 110*d*, a vehicle 110*e*, a speech-controllable display device 110*f*, a smart television 110*g*, a washer/dryer 110*h*, a refrigerator 110*i*, and/or a microwave 110*j* may be connected to the network(s) 199 through a wireless service provider, over a Wi-Fi or cellular network connection, or the like. Other devices are included as network-connected support devices, such as the system 120, the skill 125, and/or others. The support devices may connect to the network(s) 199 through a wired connection or wireless connection.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method comprising:
receiving, from a device, first audio data corresponding to a first spoken input;
determining, using the first audio data, automatic speech recognition (ASR) data corresponding to the first spoken input;
receiving, from the device, first widget context data corresponding to a first multi-modal widget being presented at the device, the first widget context data including a first widget identifier, a first skill identifier and first content being displayed at the device via the first multi-modal widget;
receiving, from the device, second widget context data corresponding to a second multi-modal widget being presented at the device, the second widget context data including a second widget identifier, a second skill identifier and second content being displayed at the device via the second multi-modal widget;
determining, using the ASR data, the first widget context data and the second widget context data, natural language understanding (NLU) data corresponding to the first spoken input, the NLU data including a first intent and a first entity corresponding to the first content;
based on the first entity corresponding to the first content and the first skill identifier included in the first widget context data, selecting, from among a plurality of skill components, a first skill component associated with the first skill identifier for processing the NLU data;
sending, to the first skill component, the NLU data and the first widget identifier;
receiving, from the first skill component, output data responsive to the first spoken input and corresponding to the first multi-modal widget;
sending, to the device, the output data; and
sending, to the device, a command to present the output data via the first multi-modal widget, the command causing the first multi-modal widget to display third content different from the first content.

2. The computer-implemented method of claim 1, further comprising:
receiving, from the device, third widget context data corresponding to a third multi-modal widget being presented at the device, the third widget context data including a third widget identifier and the first skill identifier;
determining that the first intent corresponds to the first multi-modal widget;
determining that the first intent corresponds to the third multi-modal widget;
determining third content being displayed via the third multi-modal widget at the device;
determining that the first entity is represented in the first content;
based on determining that the first entity is represented in the first content, determining the first multi-modal widget, instead of the third multi-modal widget, corresponds to the first spoken input; and
sending, in response to determining that the first intent corresponds to the first multi-modal widget, the first widget identifier to the first skill component.

3. The computer-implemented method of claim 1, further comprising:
receiving the first widget context data at a first time;
storing widget session data including the first widget context data and a first indication representing the first multi-modal widget is active;
based on receiving the first audio data from the device, storing skill session data including a user identifier and a second indication representing a skill session corresponding to the first spoken input is active;

based on sending the output data to the device, determining updated skill session data indicating the skill session is terminated;
receiving, from the device and at a third time subsequent to the first time, second audio data corresponding to a second spoken input; and
determining the first multi-modal widget is active based on the widget session data.

4. The computer-implemented method of claim 1, further comprising:
sending, to the first skill component, the first widget context data along with the NLU data;
receiving, from a device, second audio data corresponding to a second spoken input;
determining, using the second audio data, second ASR data corresponding to the second spoken input;
determining, using the second ASR data, the first widget context data and the second widget context data, second NLU data corresponding to the second spoken input;
determining a third skill component capable of processing the second NLU data, the third skill component being unassociated with the first multi-modal widget or the second multi-modal widget; and
sending, to the third skill component, the second NLU data.

5. A computer-implemented method comprising:
receiving, from a device, first audio data corresponding to a first spoken input;
receiving, from the device, first data including a first widget identifier associated with a first multi-modal widget being presented at the device, the first data including a first skill identifier corresponding to the first multi-modal widget;
receiving, from the device, second data including a second widget identifier associated with a second multi-modal widget being presented at the device, the second data includes the first skill identifier corresponding to the second multi-modal widget;
determining, using the first audio data, the first data and the second data, natural language understanding (NLU) data corresponding to the first spoken input;
determining, using the first data and the second data, that the first spoken input corresponds to the first multi-modal widget; and
sending, to a first skill component associated with the first skill identifier, the NLU data and the first widget identifier.

6. The computer-implemented method of claim 5, further comprising:
receiving first content being displayed at the device via the first multi-modal widget;
receiving second content being displayed at the device via the second multi-modal widget;
determining the NLU data including an entity;
determining that the entity is represented in the first content; and
based on the entity being represented in the first content, determining that the first spoken input corresponds to the first multi-modal widget.

7. The computer-implemented method of claim 5, wherein the first multi-modal widget is displaying first content, and the method further comprises:
receiving, from the first skill component, output data responsive to the first spoken input and to be presented via the first multi-modal widget;
sending, to the device, the output data; and
sending, to the device, a command to present the output data via the first multi-modal widget, the command causing the first multi-modal widget to display second content different from the first content.

8. The computer-implemented method of claim 5, further comprising:
receiving, from the device, second audio data corresponding to a second spoken input, wherein the second audio data is received after a period of time elapses since receipt of the first audio data; and
based on receiving the second audio data, receiving, from the device, the first data and the second data.

9. The computer-implemented method of claim 5, further comprising:
receiving, from the device, the first data further including a first time when the first multi-modal widget received most recent input;
receiving, from the device, the second data including a second time when the second multi-modal widget received most recent input;
determining that the first time occurs after the second time; and
based on determining that the first time occurs after the second time, determining that the first spoken input corresponds to the first multi-modal widget instead of the second multi-modal widget.

10. The computer-implemented method of claim 5, further comprising:
receiving, from the device, first content data being presented via the first multi-modal widget;
determining, using the first audio data and the first content data, entity data corresponding to the first spoken input; and
sending, to the first skill component, the entity data.

11. The computer-implemented method of claim 5, further comprising:
receiving the first data further including a first focus type corresponding to the first multi-modal widget, the first focus type representing the first multi-modal widget is in touch-focus;
receiving the second data further including a second focus type corresponding to the second multi-modal widget, the second focus type representing the second multi-modal widget is in visual-focus; and
determining, using at least the first focus type and the second focus type, that the first spoken input corresponds to the first multi-modal widget.

12. The computer-implemented method of claim 5, further comprising:
receiving, from the device, second audio data corresponding to a second spoken input;
receiving, from a data storage, the first data and the second data;
determining, using the second audio data, the first data and the second data, intent data and entity data corresponding to the second spoken input;
determining a third skill component capable of processing the intent data and the entity data; and
sending, to the third skill component, the intent data and the entity data.

13. A system comprising:
at least one processor; and
at least one memory including instructions that, when executed by the at least one processor, cause the system to:
receive, from a device, first audio data corresponding to a first spoken input;

receive, from the device, first data including a first widget identifier associated with a first multi-modal widget being presented at the device, the first data including a first skill identifier corresponding to the first multi-modal widget;

receive, from the device, second data including a second widget identifier associated with a second multi-modal widget being presented at the device, the second data includes the first skill identifier corresponding to the second multi-modal widget;

determine, using the first audio data, the first data and the second data, natural language understanding (NLU) data corresponding to the first spoken input;

determine, using the first data and the second data, that the first spoken input corresponds to the first multi-modal widget; and send, to a first skill component associated with the first skill identifier, the NLU data and the first widget identifier.

14. The system of claim 13, wherein the at least one memory includes further instructions that, when executed by the at least one processor, further cause the system to:

receive first content being displayed at the device via the first multi-modal widget;

receive second content being displayed at the device via the second multi-modal widget;

determine the NLU data including an entity;

determine that the entity is represented in the first content; and based on the entity being represented in the first content, determine that the first spoken input corresponds to the first multi-modal widget.

15. The system of claim 13, wherein the first multi-modal widget is displaying first content, and wherein the at least one memory includes further instructions that, when executed by the at least one processor, further cause the system to:

receive, from the first skill component, output data responsive to the first spoken input and to be presented via the first multi-modal widget;

send, to the device, the output data; and send, to the device, a command to present the output data via the first multi-modal widget, the command causing the first multi-modal widget to display second content different from the first content.

16. The system of claim 13, wherein the at least one memory includes further instructions that, when executed by the at least one processor, further cause the system to:

receive, from the device, second audio data corresponding to a second spoken input, wherein the second audio data is received after a period of time elapses since receipt of the first audio data; and based on receiving the second audio data, receive, from the device, the first data and the second data.

17. The system of claim 13, wherein the at least one memory includes further instructions that, when executed by the at least one processor, further cause the system to:

receive, from the device, the first data further including a first time when the first multi-modal widget received most recent input;

receive, from the device, the second data including a second time when the second multi-modal widget received most recent input;

determine that the first time occurs after the second time; and based on determining that the first time occurs after the second time, determining that the first spoken input corresponds to the first multi-modal widget instead of the second multi-modal widget.

18. The system of claim 13, wherein the at least one memory includes further instructions that, when executed by the at least one processor, further cause the system to:

receive, from the device, first content data being presented via the first multi-modal widget;

determine, using the first audio data and the first content data, entity data corresponding to the first spoken input; and send, to the first skill component, the entity data.

19. The system of claim 13, wherein the at least one memory includes further instructions that, when executed by the at least one processor, further cause the system to:

receive the first data further including a first focus type corresponding to the first multi-modal widget, the first focus type representing the first multi-modal widget is in touch-focus;

receive the second data further including a second focus type corresponding to the second multi-modal widget, the second focus type representing the second multi-modal widget is in visual-focus; and determine, using at least the first focus type and the second focus type, that the first spoken input corresponds to the first multi-modal widget.

20. The system of claim 13, wherein the at least one memory includes further instructions that, when executed by the at least one processor, further cause the system to:

receive, from the device, second audio data corresponding to a second spoken input;

receive, from a data storage, the first data and the second data;

determine, using the second audio data, the first data and the second data, intent data and entity data corresponding to the second spoken input;

determine a third skill component capable of processing the intent data and the entity data; and send, to the third skill component, the intent data and the entity data.

* * * * *